US010200162B2

(12) United States Patent
Chendamarai Kannan et al.

(10) Patent No.: US 10,200,162 B2
(45) Date of Patent: Feb. 5, 2019

(54) HARQ FEEDBACK IN SHARED RF SPECTRUM BAND

(71) Applicant: QUALCOMM Incorporated, San Diego, CA (US)

(72) Inventors: Arumugam Chendamarai Kannan, San Diego, CA (US); Chirag Patel, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 15/604,326

(22) Filed: May 24, 2017

(65) Prior Publication Data

US 2017/0346605 A1 Nov. 30, 2017

Related U.S. Application Data

(60) Provisional application No. 62/342,870, filed on May 27, 2016.

(51) Int. Cl.
*H04L 1/18* (2006.01)
*H04W 16/14* (2009.01)
(Continued)

(52) U.S. Cl.
CPC .......... *H04L 1/1874* (2013.01); *H04L 1/1614* (2013.01); *H04L 1/1685* (2013.01);
(Continued)

(58) Field of Classification Search
CPC ... H04L 1/1874; H04L 1/1614; H04L 1/1685; H04L 1/1835; H04W 16/14; H04W 72/0413
See application file for complete search history.

(56) References Cited

U.S. PATENT DOCUMENTS

2003/0159099 A1   8/2003 Vukovic et al.
2006/0176862 A1   8/2006 Ishimori et al.
(Continued)

OTHER PUBLICATIONS

ISA/EP, International Search Report and Written Opinion of the International Searching Authority, Int'l Application No. PCT/US2017/034546, dated Aug. 9, 2017, European Patent Office, Rijswijk, NL, 15 pgs.

*Primary Examiner* — Duc C Ho
(74) *Attorney, Agent, or Firm* — Holland & Hart LLP

(57) ABSTRACT

Methods, systems, and devices for wireless communication are described. Wireless communications systems operating in unlicensed or shared radio frequency spectrum band may use different modes to manage hybrid automatic repeat request (HARQ) feedback. HARQ feedback may be transmitted autonomously or, in some cases, HARQ feedback may be solicited from a user equipment (UE) for one or several HARQ processes. Solicited feedback may be referred to as polled feedback and autonomous feedback may be referred to as unpolled feedback. Polled and unpolled feedback may be transmitted using different physical channels, and may be grant-based or triggered without an express grant. Buffers for polled and unpolled feedback may be separately maintained and managed. In a multicarrier configuration, uplink control information (UCI) for one or more carriers may be transmitted on a subset of configured uplink carriers. A number of carriers used for UCI may depend on operating conditions of a UE.

60 Claims, 17 Drawing Sheets

(51) Int. Cl.
*H04W 72/04* (2009.01)
*H04L 1/16* (2006.01)

(52) U.S. Cl.
CPC .......... *H04L 1/1835* (2013.01); *H04W 16/14* (2013.01); *H04W 72/0413* (2013.01)

(56) References Cited

U.S. PATENT DOCUMENTS

2009/0106448 A1 4/2009 Yagiu
2011/0113299 A1* 5/2011 Power ................. H04L 1/18
 714/748
2013/0265970 A1 10/2013 Papasakellariou et al.
2017/0019909 A1* 1/2017 Si ......................... H04L 47/27

* cited by examiner

HARQ FEEDBACK IN SHARED RF SPECTRUM BAND

CROSS REFERENCES

The present application for patent claims priority to U.S. Provisional Patent Application No. 62/342,870 by Patel, et al., entitled "HARQ Feedback In Shared RF Spectrum Band," filed May 27, 2016, assigned to the assignee hereof, and is hereby expressly incorporated by reference herein in its entirety.

BACKGROUND

The following relates generally to wireless communication, and more specifically to hybrid automatic repeat request (HARQ) feedback in unlicensed radio frequency (RF) spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some wireless communications systems, devices may communicate using resources of a shared or unlicensed RF spectrum band. Such communication may be contention-based, and the shared nature of the wireless medium may introduce complexities for transmitting or receiving certain types of information, including control information. Systems that operate without accounting or compensating for the opportunistic nature of shared-spectrum communication may be inefficient or error-prone.

SUMMARY

Wireless communications systems operating in unlicensed radio frequency (RF) spectrum may use different modes to manage hybrid automatic repeat request (HARQ) feedback and the clearance of feedback buffers. For example, a wireless device may receive downlink data during a transmission opportunity (TxOP) and transmit HARQ feedback within the same TxOP or a subsequent TxOP. After the transmission of the HARQ feedback, and during a TxOP, the wireless device may receive an indication to clear a buffer with the HARQ feedback. Additionally or alternatively, the buffer may be cleared based on the transmission of the feedback. In some examples, the wireless device may indicate an ability to support uplink carriers and, in response, receive a carrier configuration. The wireless device may select a subset of uplink carriers for feedback transmissions, and transmit feedback using the subset.

A method of wireless communication is described. The method may include receiving a downlink data transmission using resources of a shared RF spectrum band during a first TxOP, transmitting HARQ feedback in response to the downlink data transmission during the first TxOP or a second TxOP, determining to clear a buffer of the HARQ feedback after transmitting the HARQ feedback during the second TxOP or a third TxOP, and clearing the HARQ feedback from the buffer based at least in part on determining to clear the buffer.

An apparatus for wireless communication is described. The apparatus may include means for receiving a downlink data transmission using resources of a shared RF spectrum band during a first TxOP, means for transmitting HARQ feedback in response to the downlink data transmission during the first TxOP or a second TxOP, means for determining to clear a buffer of the HARQ feedback after transmitting the HARQ feedback during the second TxOP or a third TxOP, and means for clearing the HARQ feedback from the buffer based at least in part on determining to clear the buffer.

Another apparatus for wireless communication is described. The apparatus may include a processor, memory in electronic communication with the processor, and instructions stored in the memory. The instructions may be operable to cause the processor to receive a downlink data transmission using resources of a shared RF spectrum band during a first TxOP, transmit HARQ feedback in response to the downlink data transmission during the first TxOP or a second TxOP, determine to clear a buffer of the HARQ feedback after transmitting the HARQ feedback during the second TxOP or a third TxOP, and clear the HARQ feedback from the buffer based at least in part on determining to clear the buffer.

A non-transitory computer-readable medium for wireless communication is described. The non-transitory computer-readable medium may include instructions operable to cause a processor to receive a downlink data transmission using resources of a shared RF spectrum band during a first TxOP, transmit HARQ feedback in response to the downlink data transmission during the first TxOP or a second TxOP, determine to clear a buffer of the HARQ feedback after transmitting the HARQ feedback during the second TxOP or a third TxOP, and clear the HARQ feedback from the buffer based at least in part on determining to clear the buffer.

Some examples of the method, apparatus, and non-transitory computer-readable medium described above may further include processes, features, means, or instructions for identifying a trigger for transmitting additional HARQ feedback. Some examples of the method, apparatus, and non-transitory computer-readable medium described above may further include processes, features, means, or instructions for transmitting the additional HARQ feedback based at least in part on the trigger. Some examples of the method, apparatus, and non-transitory computer-readable medium described above may further include processes, features, means, or instructions for clearing the additional HARQ feedback from an additional buffer based at least in part on transmitting the additional HARQ feedback.

In some examples of the method, apparatus, and non-transitory computer-readable medium described above, the buffer may be associated with a request-based feedback mode and the additional buffer may be associated with an autonomous feedback mode.

Some examples of the method, apparatus, and non-transitory computer-readable medium described above may further include processes, features, means, or instructions for receiving a request to transmit the HARQ feedback. Some examples of the method, apparatus, and non-transitory computer-readable medium described above may further include processes, features, means, or instructions for receiving a grant of resources for the HARQ feedback, wherein the HARQ feedback may be transmitted using the resources in response to the request.

In some examples of the method, apparatus, and non-transitory computer-readable medium described above, the grant of resources includes an indication of an identifier for a HARQ process of the HARQ feedback. In some examples of the method, apparatus, and non-transitory computer-readable medium described above, the request comprises a request to retransmit a subset of previously transmitted feedback.

Some examples of the method, apparatus, and non-transitory computer-readable medium described above may further include processes, features, means, or instructions for identifying a trigger for transmitting the HARQ feedback, wherein the HARQ feedback may be transmitted based at least part on identifying the trigger. In some examples of the method, apparatus, and non-transitory computer-readable medium described above, the buffer comprises a common buffer for a short physical uplink control channel (sPUCCH), an enhanced physical uplink control channel (ePUCCH), or a physical uplink shared channel (PUSCH). Some examples of the method, apparatus, and non-transitory computer-readable medium described above may further include processes, features, means, or instructions for clearing the buffer according to a predetermined periodicity.

A method of wireless communication is described. The method may include transmitting a downlink data transmission using resources of a shared RF spectrum band during a first TxOP, receiving HARQ feedback in response to the downlink data transmission during the first TxOP or a second TxOP, and transmitting an indication to clear a buffer of the feedback during the second TxOP or a third TxOP.

An apparatus for wireless communication is described. The apparatus may include means for transmitting a downlink data transmission using resources of a shared RF spectrum band during a first TxOP, means for receiving HARQ feedback in response to the downlink data transmission during the first TxOP or a second TxOP, and means for transmitting an indication to clear a buffer of the feedback during the second TxOP or a third TxOP.

Another apparatus for wireless communication is described. The apparatus may include a processor, memory in electronic communication with the processor, and instructions stored in the memory. The instructions may be operable to cause the processor to transmit a downlink data transmission using resources of a shared RF spectrum band during a first TxOP, receive HARQ feedback in response to the downlink data transmission during the first TxOP or a second TxOP, and transmit an indication to clear a buffer of the feedback during the second TxOP or a third TxOP.

A non-transitory computer-readable medium for wireless communication is described. The non-transitory computer-readable medium may include instructions operable to cause a processor to transmit a downlink data transmission using resources of a shared RF spectrum band during a first TxOP, receive HARQ feedback in response to the downlink data transmission during the first TxOP or a second TxOP, and transmit an indication to clear a buffer of the feedback during the second TxOP or a third TxOP.

Some examples of the method, apparatus, and non-transitory computer-readable medium described above may further include processes, features, means, or instructions for identifying a trigger for additional HARQ feedback. Some examples of the method, apparatus, and non-transitory computer-readable medium described above may further include processes, features, means, or instructions for receiving the additional HARQ feedback based at least in part on the trigger.

Some examples of the method, apparatus, and non-transitory computer-readable medium described above may further include processes, features, means, or instructions for transmitting a request for the HARQ feedback. Some examples of the method, apparatus, and non-transitory computer-readable medium described above may further include processes, features, means, or instructions for transmitting a grant of resources for the HARQ feedback, wherein the HARQ feedback may be transmitted using the resources in response to the request.

Some examples of the method, apparatus, and non-transitory computer-readable medium described above may further include processes, features, means, or instructions for determining that an identifier for a HARQ process associated with the downlink data transmission may be unacknowledged, wherein the request for HARQ feedback may be transmitted based at least in part on the determination.

Some examples of the method, apparatus, and non-transitory computer-readable medium described above may further include processes, features, means, or instructions for determining that an identifier for a HARQ process associated with the downlink data transmission may be unacknowledged. Some examples of the method, apparatus, and non-transitory computer-readable medium described above may further include processes, features, means, or instructions for transmitting an additional downlink data transmission based at least in part on a determination.

In some examples of the method, apparatus, and non-transitory computer-readable medium described above, the buffer comprises a common buffer for an sPUCCH, an ePUCCH, or a PUSCH.

A method of wireless communication is described. The method may include transmitting an indication of a quantity of uplink carriers of a shared RF spectrum band for which uplink control information (UCI) transmissions are supported, receiving a carrier configuration that includes a set of uplink carriers for UCI transmissions based at least in part on the indication, selecting a subset of the uplink carriers for UCI transmissions, wherein the subset comprises fewer uplink carriers than the set of uplink carriers for UCI, and transmitting UCI using the subset of the uplink carriers.

An apparatus for wireless communication is described. The apparatus may include means for transmitting an indication of a quantity of uplink carriers of a shared RF spectrum band for which UCI transmissions are supported, means for receiving a carrier configuration that includes a set of uplink carriers for UCI transmissions based at least in part on the indication, means for selecting a subset of the uplink carriers for UCI transmissions, wherein the subset comprises fewer uplink carriers than the set of uplink carriers for UCI, and means for transmitting UCI using the subset of the uplink carriers.

Another apparatus for wireless communication is described. The apparatus may include a processor, memory in electronic communication with the processor, and instructions stored in the memory. The instructions may be operable to cause the processor to transmit an indication of a quantity of uplink carriers of a shared RF spectrum band for which UCI transmissions are supported, receive a carrier configuration that includes a set of uplink carriers for UCI transmissions based at least in part on the indication, select a subset of the uplink carriers for UCI transmissions, wherein the subset comprises fewer uplink carriers than the set of uplink carriers for UCI, and transmit UCI using the subset of the uplink carriers.

A non-transitory computer-readable medium for wireless communication is described. The non-transitory computer-readable medium may include instructions operable to cause a processor to transmit an indication of a quantity of uplink carriers of a shared RF spectrum band for which UCI transmissions are supported, receive a carrier configuration that includes a set of uplink carriers for UCI transmissions based at least in part on the indication, select a subset of the uplink carriers for UCI transmissions, wherein the subset comprises fewer uplink carriers than the set of uplink carriers for UCI, and transmit UCI using the subset of the uplink carriers.

Some examples of the method, apparatus, and non-transitory computer-readable medium described above may further include processes, features, means, or instructions for identifying a local condition of a user equipment (UE), wherein the subset of the uplink carriers may be selected by the UE based at least in part on the local condition of the UE.

In some examples of the method, apparatus, and non-transitory computer-readable medium described above, the local condition comprise a power consumption condition of the UE, a power headroom condition of the UE, an interference profile of devices neighboring the UE, or a simultaneous transmission condition.

In some examples of the method, apparatus, and non-transitory computer-readable medium described above, the UCI comprises feedback for a plurality of downlink carriers of the carrier configuration. In some examples of the method, apparatus, and non-transitory computer-readable medium described above, the UCI comprises an indicator of downlink carriers of the carrier configuration.

Some examples of the method, apparatus, and non-transitory computer-readable medium described above may further include processes, features, means, or instructions for receiving an indication of the subset of uplink carriers from a base station, wherein the subset of the uplink carriers may be selected based at least in part on the received indication. In some examples of the method, apparatus, and non-transitory computer-readable medium described above, the received indication may be received via radio resource control (RRC) signaling or in a resource grant.

Some examples of the method, apparatus, and non-transitory computer-readable medium described above may further include processes, features, means, or instructions for receiving a payload configuration for the UCI, wherein the payload configuration comprises an indication at least one of HARQ feedback, a scheduling request (SR), channel state information (CSI), a rank indicator (RI), a precoding matrix indicator (PMI), or a hidden node interference indicator.

Some examples of the method, apparatus, and non-transitory computer-readable medium described above may further include processes, features, means, or instructions for receiving a downlink control message. Some examples of the method, apparatus, and non-transitory computer-readable medium described above may further include processes, features, means, or instructions for identifying a resource interlace for transmitting the UCI based at least in part on the downlink control message and one or more additional parameters.

In some examples of the method, apparatus, and non-transitory computer-readable medium described above, the resource interlace comprises at least one of a cyclic shift or Walsh code index. In some examples of the method, apparatus, and non-transitory computer-readable medium described above, the one or more additional parameters comprises at least one of a control channel element (CCE) of a common physical downlink control channel (C-PDCCH) or an indicator received via radio resource control (RRC) signaling.

A method of wireless communication is described. The method may include receiving an indication of a quantity of uplink carriers of a shared RF spectrum band for which UCI transmissions are supported, transmitting a carrier configuration that includes a set of uplink carriers for UCI based at least in part on the indication, and receiving UCI using a subset of the uplink carriers.

An apparatus for wireless communication is described. The apparatus may include means for receiving an indication of a quantity of uplink carriers of a shared RF spectrum band for which UCI transmissions are supported, means for transmitting a carrier configuration that includes a set of uplink carriers for UCI based at least in part on the indication, and means for receiving UCI using a subset of the uplink carriers.

Another apparatus for wireless communication is described. The apparatus may include a processor, memory in electronic communication with the processor, and instructions stored in the memory. The instructions may be operable to cause the processor to receive an indication of a quantity of uplink carriers of a shared RF spectrum band for which UCI transmissions are supported, transmit a carrier configuration that includes a set of uplink carriers for UCI based at least in part on the indication, and receive UCI using a subset of the uplink carriers.

A non-transitory computer-readable medium for wireless communication is described. The non-transitory computer-readable medium may include instructions operable to cause a processor to receive an indication of a quantity of uplink carriers of a shared RF spectrum band for which UCI transmissions are supported, transmit a carrier configuration that includes a set of uplink carriers for UCI based at least in part on the indication, and receive UCI using a subset of the uplink carriers.

Some examples of the method, apparatus, and non-transitory computer-readable medium described above may further include processes, features, means, or instructions for selecting a subset of the uplink carriers for UCI transmissions, wherein the subset comprises fewer uplink carriers than the set for UCI transmissions. Some examples of the method, apparatus, and non-transitory computer-readable medium described above may further include processes, features, means, or instructions for transmitting an indication of the subset to a UE.

Some examples of the method, apparatus, and non-transitory computer-readable medium described above may further include processes, features, means, or instructions for identifying a least one of a channel quality for the UE, a powerhead room report of the UE, or a past history of listen-before-talk (LBT) success by the UE, wherein the subset of the uplink carriers may be selected based at least in part on the identifying. In some examples of the method, apparatus, and non-transitory computer-readable medium described above, the indication of the subset comprises RRC signaling or a resource grant.

Some examples of the method, apparatus, and non-transitory computer-readable medium described above may further include processes, features, means, or instructions for transmitting a downlink control message. Some examples of the method, apparatus, and non-transitory computer-readable medium described above may further include processes, features, means, or instructions for identifying a resource interlace for the UCI based at least in part on the downlink control message and one or more additional parameters.

In some examples of the method, apparatus, and non-transitory computer-readable medium described above, the resource interlace comprises at least one of a cyclic shift or Walsh code index. In some examples of the method, apparatus, and non-transitory computer-readable medium described above, the one or more additional parameters comprises at least one of a CCE of a C-PDCCH or an indicator received via RRC signaling.

DETAILED DESCRIPTION

Figure 1:
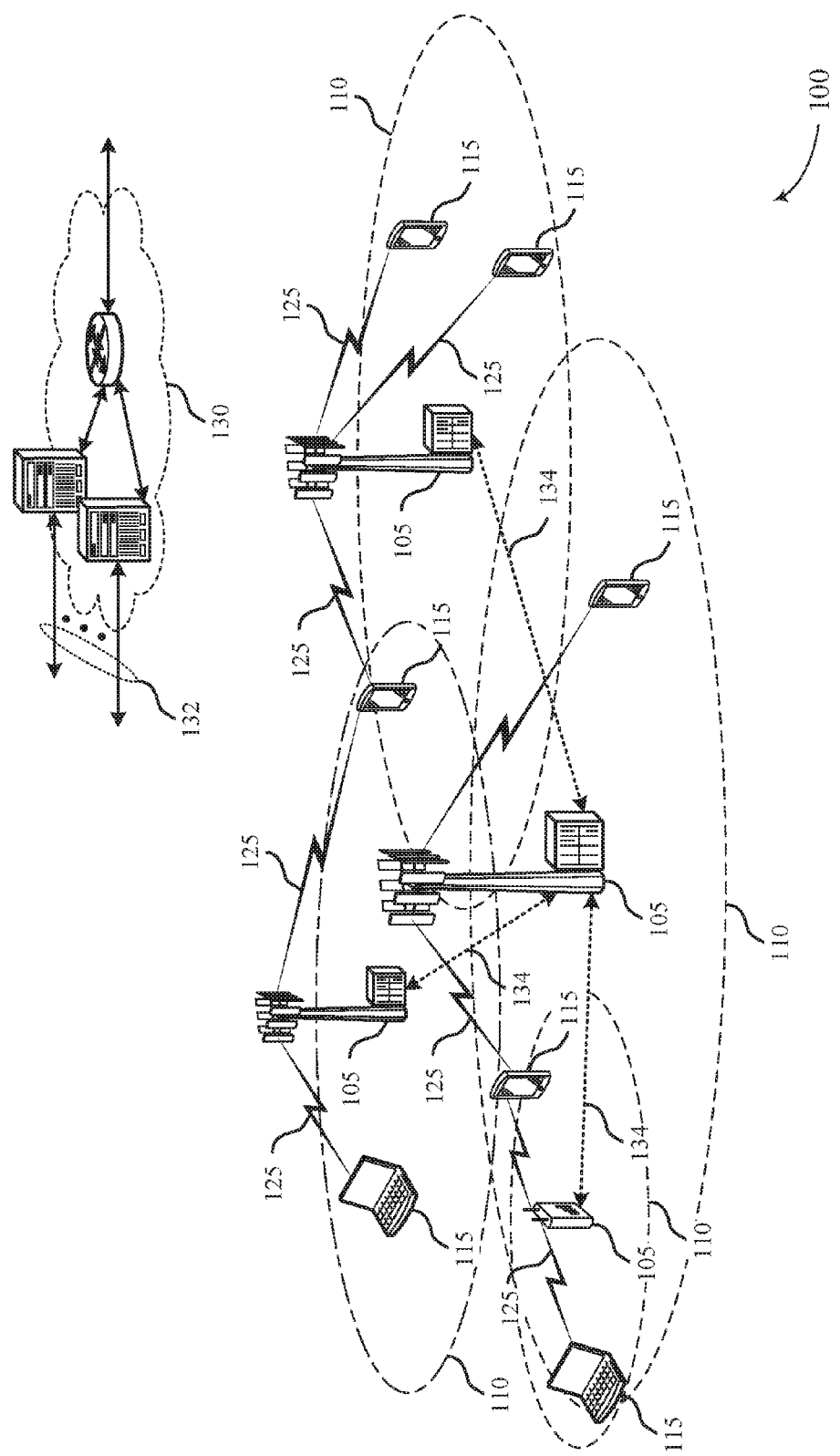
FIG. 1 illustrates an example of a system for wireless communication that supports hybrid automatic repeat request (HARQ) feedback in unlicensed radio frequency (RF) spectrum in accordance with various aspects of the present disclosure.

A user equipment (UE) may use different modes to manage hybrid automatic repeat request (HARQ) feedback, and the various modes may account for or be activated based on operating conditions of a system using a shared or unlicensed radio frequency (RF) spectrum band. In some instances, a shared spectrum band may refer to spectrum that is lightly licensed and/or in which there may be some level of coordination among communications of different radio access technologies (RATs) or some level of preference given to communications of a particular RAT, such as an incumbent RAT, for example. In other instances, a shared spectrum band may generally refer to spectrum in which different RATs coexist or operate within the same RF spectrum band, which may include lightly licensed/coordinated spectrum or, alternatively, purely unlicensed spectrum in which different RATs may freely contend for access to the channel medium using various channel contention techniques. The aspects described in the present disclosure may be applicable to various shared or unlicensed spectrum regimes. Accordingly, the terms shared spectrum and unlicensed spectrum are used interchangeably herein unless otherwise noted.

While operating in unlicensed RF spectrum band, a UE may send feedback messages for data received from the base station. However, a UE may be capable of transmitting feedback using a variety of different techniques, and transmissions based on these techniques may introduce a number of redundancies and result in increased operational uncertainty within the system. Such redundancy and uncertainties may negatively affect communication efficiency. Accordingly, the UE may use techniques, as described in further detail below, that are based on certain channel conditions or conditions of the wireless medium to address the potential problems described above.

By way of example, HARQ feedback may be transmitted autonomously at predefined resources (e.g., a special subframe) or, in some cases, HARQ feedback may be solicited from a UE for one or several HARQ processes. Solicited feedback may be referred to as polled feedback or request-based feedback, and autonomous feedback may be referred to as unpolled feedback. Polled and unpolled feedback may be transmitted using different physical channels, and may be grant-based or triggered without an explicit grant. Buffers for polled and unpolled feedback may be separately maintained and managed.

HARQ feedback may be transmitted using one or several physical channels. For example, a UE may transmit uplink control information (UCI) using a short physical uplink control channel (sPUCCH), an enhanced physical uplink control channel (ePUCCH), or a physical uplink shared channel (PUSCH). The use of different control channels may be based on signals received from a base station, such as a trigger, or a grant that enables a UE to transmit to the base station during a transmission opportunity (TxOP). However, a prioritization associated with different channels and a potential overlap of UCI across the different channels may result in complex scheduling and feedback processes. Accordingly, the feedback channel used by each UE, or group of UEs, may be different, and there is a possibility for redundancy and ambiguity related to the different ways in which UCI may be transmitted in various channels. Examples of such redundancy and ambiguity are described in further detail below with respect to FIG. 1.

Some wireless communications systems may use different feedback operations, such as polled operation (e.g., where a base station explicitly directs a UE to provide feedback using a certain channel) and unpolled operation (e.g., where a UE provides feedback autonomously, and the base station does not explicitly tell the UE when to provide feedback). To avoid unwanted redundancy and ambiguity, a wireless communications system may use certain channels for polled and unpolled operation. Separate HARQ buffers may also be maintained for autonomous and polled operations, and these buffers may be cleared based on polled or unpolled operation.

Techniques may also enable optimization of UE power use and/or LBT success when transmitting HARQ feedback. The UE may indicate that it has a capability to use a number of uplink carriers, and a base station may configure the UE to transmit UCI on a set of the uplink carriers. Based on power consumption requirements and an interference profile of neighboring UEs, the UE may determine a subset of uplink carriers to transmit UCI on.

Aspects of the disclosure introduced above are described below in the context of a wireless communications system. Further examples are given that illustrate different physical channels used for the transmission of UCI, including HARQ feedback. Aspects of the disclosure are further illustrated by and described with reference to apparatus diagrams, system diagrams, and flowcharts that relate to HARQ feedback in unlicensed RF spectrum.

FIG. 1 illustrates an example of a wireless communications system 100 that supports HARQ feedback in unlicensed RF spectrum in accordance with various aspects of the present disclosure. The wireless communications system 100 includes base stations 105, UEs 115, and a core network 130. In some examples, the wireless communications system 100 may be a long term evolution (LTE) or LTE-Advanced (LTE-A) network. Wireless communications system 100 may allow for efficient HARQ feedback using feedback operations that enable the clearance of feedback from a buffer.

Wireless communications system 100 may include an LTE/LTE-A network, a MuLTEFire network, a neutral host small cell network, or the like, operating with overlapping coverage areas 110. A MuLTEFire network may include access points (APs) and/or base stations 105 communicating in an unlicensed RF spectrum band, e.g., without a licensed frequency anchor carrier. For example, the MuLTEFire network may operate without an anchor carrier in the licensed spectrum.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

HARQ may be a method of ensuring that data is received correctly over a wireless communication link 125. HARQ may include a combination of error detection (e.g., using a cyclic redundancy check (CRC)), forward error correction (FEC), and retransmission (e.g., using an automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgment (NACK) indicating a failed attempt to decode the information. The chain of transmission, response and retransmission may be referred to as a HARQ process. In some cases, a limited number of HARQ processes may be used for a given communication link 125.

A physical uplink control channel (PUCCH) may be used for uplink acknowledgments (ACKs), scheduling requests (SRs), channel quality indicators (CQIs), and other UCI. A PUCCH may be mapped to a control channel defined by a code and two consecutive resource blocks. Uplink control signaling may depend on the presence of timing synchronization for a cell. PUCCH resources for SR and CQI reporting may be assigned (and revoked) through radio resource control (RRC) signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized.

Wireless communications system 100 may support uplink transmission using an ePUCCH. An ePUCCH may include resources from portions of several resource blocks. For example, ePUCCH may be interleaved with other transmissions within resource blocks. In some cases, ePUCCH transmissions from several UEs 115 may be interleaved within a set of resource blocks.

Wireless communications system 100 may also support a shortened control channel, which may be referred to as a short-duration PUCCH or sPUCCH. An sPUCCH may use a similar interleave structure as ePUCCH, but may include resources of a smaller number of resource blocks. For example, sPUCCH may use resources of four or fewer orthogonal frequency division multiplexing (OFDM) symbols. In some examples, UE 115 may transmit an sPUCCH using a special subframe (e.g., a subframe that allows switching from downlink to uplink scheduling, or vice versa), and base station 105 may use a common physical downlink control channel (C-PDCCH) to dynamically indicate the presence of the special subframe to a UE 115. The ability of the UE 115 to transmit a control message using the shortened control channel may be indicated by the presence of a downlink message (e.g., a downlink grant, etc.) from the base station 105. In some cases, the control message may be transmitted in unlicensed spectrum using a channel that includes multiple sub-bands, such as an 80 MHz channel comprising four 20 MHz bands.

In some cases, a UE 115 or base station 105 may operate in a shared or unlicensed RF spectrum. These devices may perform a listen-before-talk (LBT) procedure such as a clear channel assessment (CCA) prior to communicating in order to determine whether the channel is available. A CCA may include an energy detection procedure to determine whether there are any other active transmissions. For example, the device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

A wireless device that uses a radio access technology (RAT), such as LTE/LTE-A, may operate as a standalone carrier in multiple bands of shared or unlicensed RF spectrum. As a result, the wireless device may use techniques from one RAT (e.g., LTE/LTE-A) to improve upon those used by a different RAT that also communicates within unlicensed RF spectrum, such as Wi-Fi. For example, HARQ feedback processes may be used by wireless devices to enable efficient communication in unlicensed RF spectrum, where HARQ feedback may be stored in a buffer to be made available for retransmission.

Wireless devices operating in the shared or unlicensed RF spectrum may use different channels to transmit control information. For example, a UE 115 may transmit UCI using an sPUCCH (e.g., a control channel that has a duration less than a subframe), an ePUCCH, or a PUSCH. The use of different control channels may be based on signals received from a base station 105, such as a trigger, or a grant that enables a UE 115 to transmit to the base station 105 during a TxOP.

Transmissions of HARQ feedback in unlicensed spectrum may be affected by a number of factors, including factors associated with the number of different channels used to transmit HARQ feedback (such as feedback timing, impact of LBT processes, and feedback buffer management). Additionally, multi-carrier operation for both uplink and downlink transmissions, payload size management (e.g., mapping, compression, etc.), payload mapping (e.g., mapping HARQ, channel state information (CSI), and SR to a channel), and control channel resource allocation (such as resource allocation for a PUCCH) may also serve as factors in transmitting HARQ feedback in unlicensed RF spectrum.

However, in some cases, a prioritization associated with different channels and a potential overlap of control information, such as UCI, across the different channels may result in complex scheduling and feedback processes. For example, an sPUCCH transmission may not be grant based and instead may be triggered implicitly based on a detection of a C-PDCCH. An sPUCCH may also carry an ACK or NACK for those subframes which meet a HARQ feedback timeline (e.g., an N+4 timeline, where N is the subframe in which a particular downlink transmission is received and HARQ feedback for that particular downlink transmission is provided at least 4 subframes later), and other ACK/NACK messages may be transmitted at the next sPUCCH opportunity (e.g., during a subsequent TxOP). Similarly, ePUCCH may either be uplink grant based or C-PDCCH trigger based, and both ePUCCH and sPUCCH may be triggered per UE 115, per group of UEs 115, or for all UEs 115. Lastly, UCI on a PUSCH may be uplink grant based and UE 115 specific. Accordingly, the feedback channel used by each UE 115, or group of UEs 115, may be different, and there is a possibility for redundancy and ambiguity related to the different ways in which UCI may be transmitted in various channels. In some cases, a trigger for UCI on ePUCCH and UCI on PUSCH may be a common trigger, e.g., in an uplink grant. The uplink grant may contain bits indicating where UCI should be sent (e.g., using ePUCCH, PUSCH, or both) where the resources (e.g., subframes) for UCI feedback may be the same or different for ePUCCH and PUSCH.

As an example of ambiguity encountered when a number of channels may be used for feedback, a first UE 115 may send UCI using a PUSCH, where a second UE 115 may not have a PUSCH grant, and one or both of the UEs 115 may be triggered to send sPUCCH. However, it may not be clear whether the first UE 115 should repeat a transmission of UCI on sPUCCH if it has already transmitted UCI. Additionally, there may not be a clearly defined precedence rule among different channels, and it may not be clear whether a UE 115 should retain feedback buffers after transmitting UCI (e.g., to repeat on another channel). In another example, HARQ feedback may be based on a HARQ process identity (ID), which may be implicitly or explicitly signaled. In the case of repeated HARQ feedback transmissions from a UE 115, a base station 105 may reuse previously acknowledged HARQ process IDs when scheduling new transmissions. In such cases, the UE 115 may be tasked with ensuring ambiguity is avoided, for example, by determining the correct HARQ feedback associated with the reused HARQ process ID. In an example that illustrates redundancy in feedback transmissions, ACK/NACKs for certain subframes may be transmitted in a first TxOP using sPUCCH, where other ACK/NACKs are transmitted in a subsequent TxOP using another sPUCCH. An intervening ePUCCH/PUSCH transmission that includes these same ACK/NACKs may lead to redundant feedback in the system.

Thus, wireless communications system 100 may operate in unlicensed RF spectrum and use different modes to manage HARQ feedback and the clearance of feedback buffers. For example, a wireless device may receive downlink data from a base station 105 during a TxOP and transmit HARQ feedback within the same TxOP or a subsequent TxOP. After the transmission of the HARQ feedback, and during a TxOP, the wireless device may determine to clear a buffer based on receiving an indication from the base station 105. The base station 105 may transmit the indication after receiving the HARQ feedback, and may indicate or identify the HARQ feedback to be cleared from the buffer, or the buffer to be cleared, within the indication. Additionally or alternatively, the buffer may be cleared automatically based on the transmission of the feedback. In some examples, the wireless device may indicate an ability to support uplink carriers and, in response, receive a carrier configuration. The wireless device may select a subset of uplink carriers for feedback transmissions, and transmit feedback using the subset.

Figure 2:
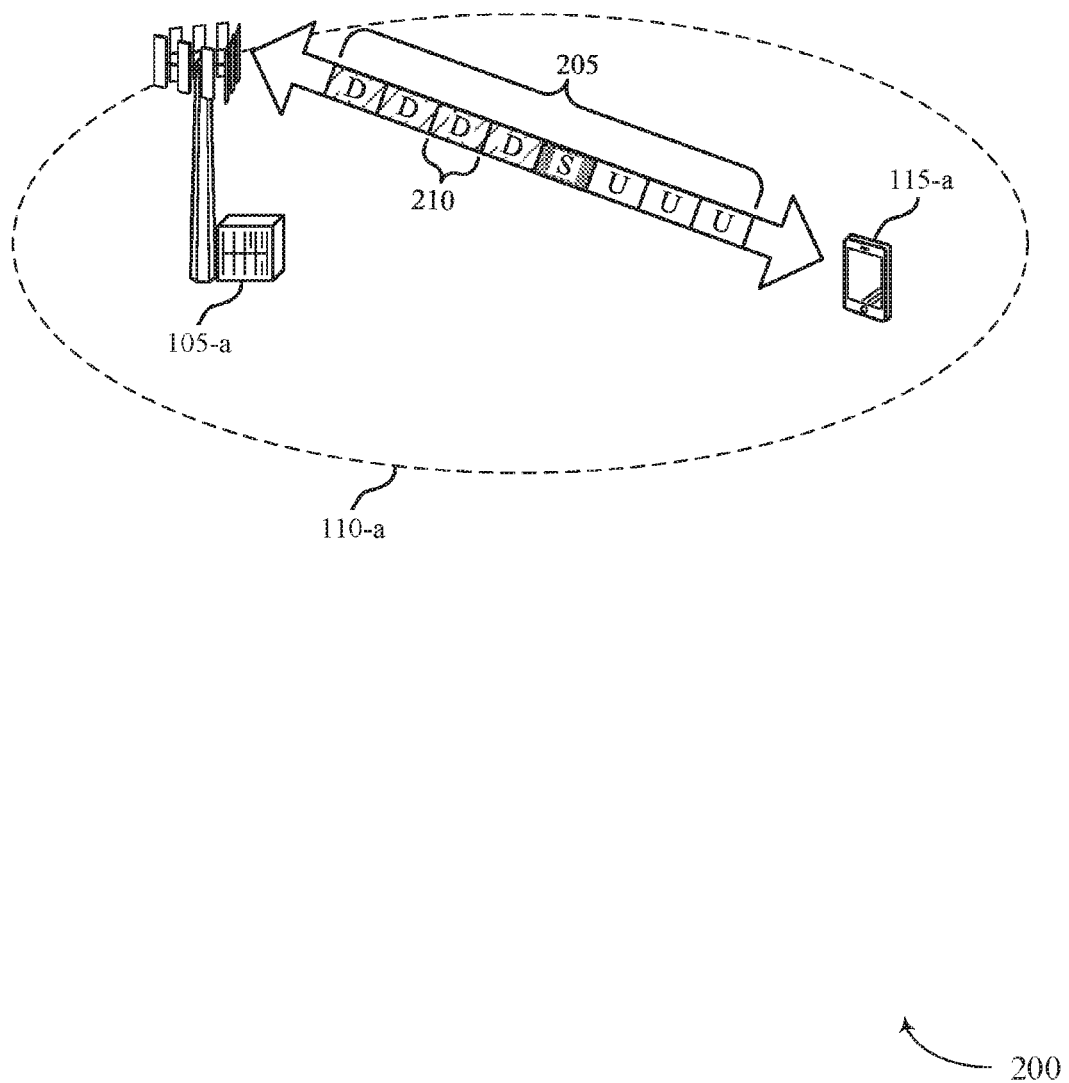
FIG. 2 illustrates an example of a wireless communications system that supports HARQ feedback in unlicensed RF spectrum in accordance with various aspects of the present disclosure.

FIG. 2 illustrates an example of a wireless communications system 200 that supports HARQ feedback in unlicensed RF spectrum in accordance with various aspects of the present disclosure. Wireless communications system 200 may include base station 105-a, with a corresponding coverage area 110-a, and UE 115-a, which may be examples of a base station 105, coverage area 110, and UE 115 as described with reference to FIG. 1. Wireless communications system 200 may support the use of separate HARQ feedback buffers and different channels for efficient HARQ feedback. Additionally, wireless communications system 200 may use different feedback operations, such as polled operation (e.g., where base station 105-a explicitly directs UE 115-a to provide feedback in a certain channel, such as an ePUCCH) and unpolled operation (e.g., where UE 115-a provides feedback autonomously, and base station 105-a does not explicitly tell UE 115-a when to provide feedback).

To resolve scheduling complexity due to ambiguity and redundancy, as discussed above, wireless communications system 200 may use certain channels (e.g. trigger-based sPUCCH, ePUCCH, or ePUSCH) for unpolled operation, and other channels (e.g., grant-based ePUCCH) for polled operation. For example, for a downlink data transmission received during TxOP 205, UE 115-a may transmit HARQ feedback using different channels within subframes 210, where the type of channel used (e.g., a grant-based or trigger-based channel) may depend on polled or unpolled operation described above. Separate buffers for HARQ feedback may also be maintained for autonomous and polled operations. In some examples, when either a trigger-based channel or a grant-based channel is scheduled, UE 115-a may send available HARQ feedback at the earliest opportunity (e.g., at a subframe N+4 or later).

When communicating in unlicensed RF spectrum, there may be an increased probability that a feedback transmission is lost due to LBT failures and/or interference. As a result, the use of polled operation may be used to request that UE 115-a transmit missing HARQ feedback. That is, base station 105-a may provide an uplink grant for a grant-based channel (e.g., an uplink grant for ePUCCH) that further indicates a subset of HARQ feedback to be re-transmitted by UE 115-a. The subset of HARQ feedback may be indicated with a limited granularity to limit a size of the uplink grant. In some cases, to allow the retransmission of HARQ feedback, UE 115-a may maintain a separate HARQ buffer for polled operation until base station 105-a provides a trigger to UE 115-a that indicates the HARQ buffer may be cleared. In this way, UE 115-a may store HARQ feedback that has been identified as lost for possible repeated retransmissions, in case the HARQ feedback is lost again. Buffers for unpolled operation may be cleared immediately after transmission. In such cases, HARQ feedback may be cleared because it may not be used again in unpolled operation, and may instead be stored later in a buffer for polled operations if the base station 105-a indicates that the unpolled HARQ feedback is not properly received. In some cases, HARQ feedback that meets a timeline is transmitted, while other ACK/NACK bits are transmitted in the next similar opportunity (i.e., a next unpolled HARQ feedback opportunity for unpolled HARQ operation, and a next polled HARQ feedback opportunity for polled operation).

In some examples, a trigger-based channel (e.g., sPUCCH or PUSCH) may be used for unpolled HARQ feedback and a grant-based or trigger-based channel (e.g., ePUCCH, whether trigger based or grant based) may be used for polled operation. In such cases, when using polled operation, a previous "K" pending ACK/NACKs are transmitted over ePUCCH, a first "K" ACK/NACK since the last ePUCCH buffer clearance may be transmitted, or an uplink grant for ePUCCH may specify the missing ACK/NACKs to be transmitted. As mentioned above, separate buffers with HARQ feedback may be maintained for polled and unpolled operation, where buffers for unpolled operation may be cleared immediately after transmission, and buffers for polled operation are cleared after an explicit base station indication to do so is received.

In some cases, base station 105-a may not implement polled operations to request retransmission of missing feedback transmissions. Instead, UE 115-a may transmit HARQ feedback (e.g., in an unpolled operation) at the earliest available (and configured) uplink channel, e.g., whether it is sPUCCH or ePUCCH (trigger or grant based) or PUSCH. In such cases, a common buffer may be used for sPUCCH, ePUCCH, and PUSCH based HARQ feedback, and the buffer may be cleared upon an explicit base station indication to do so and/or completion of a certain fixed time duration.

HARQ feedback for unpolled operation may be associated with an implicit HARQ process ID indication, (e.g., an i-th bit of HARQ corresponds to a HARQ process ID of j without loss of generality (e.g., semi-static mapping)). Additionally or alternatively, if a HARQ process ID is not scheduled, the HARQ feedback may be set to NACK by default. In some cases, HARQ feedback for polled operation in an uplink grant may include an explicit indication of the HARQ process ID. Based on this explicit indication, base station 105-a may identify a bitmap per HARQ process ID, or a set of HARQ process IDs, for which to request ACK/NACK feedback. Scheduling of HARQ process IDs by base station 105-a may be a scheduling decision, where unacknowledged HARQ process IDs may either be polled or new data may be transmitted.

In some cases, HARQ feedback transmissions related to multi-carrier operation may be enhanced. For example, if UE 115-a supports N uplink carriers, a wireless communication system may allow UE 115-a to send HARQ ACK on all of the carriers simultaneously, subject to a configuration of base station 105-a. As an example, the support for multiple carriers may be applicable to ePUCCH and sPUCCH transmissions. However, configuring HARQ feedback for M downlink carriers to be transmitted on N uplink carriers, where M>N, may inflate the payload of the control channel transmission and therefore impact the coverage range for uplink transmission. As an example, when M=4 and N=1, the coverage range may be reduced by as much as 6 dB, which may have a significant impact for UEs 115 located at a cell edge. However, multi-carrier operation may provide the benefit of aggregating all downlink HARQs on a subset of uplink carriers, allowing efficiency and power savings on some uplink carriers (which may not be activated for uplink control signaling alone). In some cases (e.g., when configuring HARQ feedback for M downlink carriers when M>N), transmitting feedback on more than one uplink carrier may incur redundancy of UCI information across multiple carriers, which may impact power consumption at UE 115-a. However, this redundancy may provide the benefit of increasing LBT success of UCI transmissions for UE 115-a.

Wireless communications system 200 may manage the tradeoff of increasing both LBT success and power consumption dynamically. For example, wireless communications system 200 may be directed to the optimization of UE power use or LBT success. In such cases, UE 115-a may indicate that it has a capability to use N uplink carriers, which may be a static number of carriers. Base station 105-a may configure UE 115-a to transmit UCI on up to $N_1$ uplink carriers, where $N_1 \leq N$. In some cases, base station 105-a may base the configuration on power consumption requirements, an interference profile of neighboring UEs 115 (e.g., for LBT success), a power headroom of UE 115-a, or simultaneous transmissions on multiple channels (e.g., PUCCH on some channels and PUSCH on others). UE 115-a may determine a subset of uplink carriers N_2 to transmit UCI on. In some cases, each uplink carrier may contain HARQ feedback for all downlink carriers, and $N_2$ may not be specified explicitly by UE 115-a. If each uplink carrier contains HARQ feedback for a subset of downlink carriers, then the control channel payload may include a field to indicate the number and index of the component carriers (CCs) for which the HARQ feedback is carried in the payload.

In some cases, there may be an optimization for coverage and scheduling within wireless communications system 200. That is, UE 115-a may indicate a capability of using N uplink carriers, and considering a coverage range and scheduling requirements for UE 115-a, base station 105-a may semi-statically configures a subset of $N_1$ uplink carriers, where $N_1 \leq N$. Base station 105-a may also consider UE power consumption and previous LBT success history on each uplink carrier. In some cases, a semi-static configuration of $N_1$ carriers per UE 115 may be indicated via RRC signaling. Additionally or alternatively, there may be a dynamic configuration of $N_1$ carriers per UE 115 as indicated via a grant, such as in cases where a channel used for feedback is grant based.

Payload mapping (e.g., HARQ, CSI, and SR mapping) may be further used to enhance HARQ feedback transmission. In some examples, ePUCCH and sPUCCH may carry HARQ feedback; an SR; or CSI, which may include a rank indicator (RI) and a precoding matrix indicator (PMI); or a combination thereof. In some cases, a payload may be configured for multiple carriers, and a field carrying a hidden node interference indication may also be included in the UCI. In such cases, the field may convey that one or more NACKs were caused due to hidden node interference that is unknown to base station 105-a.

In some cases, one or more of the indicator fields may be present depending on a base station configuration, and different channels may use different configurations. For example, an sPUCCH may use a semi-static configuration, whereas an ePUCCH may use a semi-static configuration or an explicit grant indication. For instance, a few bits of indication may be used to configure UE 115-a to transmit either HARQ feedback, CSI feedback, or both, including variations of an RI (e.g., Rank1 and Rank2) for a reported rank value. Additionally, the order of encoding may follow a per-CC encoding, with CSI and HARQ encoded as configured per-CC.

A channel resource index may be used to enhance the communication of control channels in unlicensed spectrum. For example, a PUCCH resource index table may be used to identify PUCCH resources derived as a function of a starting control channel element (CCE) of PDCCH, a PUCCH shift, a resource block (RB) allocation, or a combination thereof. In some cases, a resource may refer to an interlace allocated for uplink control channel transmissions (e.g., PUCCH) and a cyclic shift/Walsh code index used for multiplexing within the same interlace. For a grant-based channel such as ePUCCH, the channel resources may be derived based on a starting CCE of an uplink grant and other semi-static parameters. Additionally or alternatively, for trigger-based channels (e.g., sPUCCH/ePUCCH), the resources may be derived using a starting CCE of a downlink grant and other semi-static parameters or a starting CCE of a downlink grant and a starting CCE of a C-PDCCH and other semi-static parameters.

Figure 3:
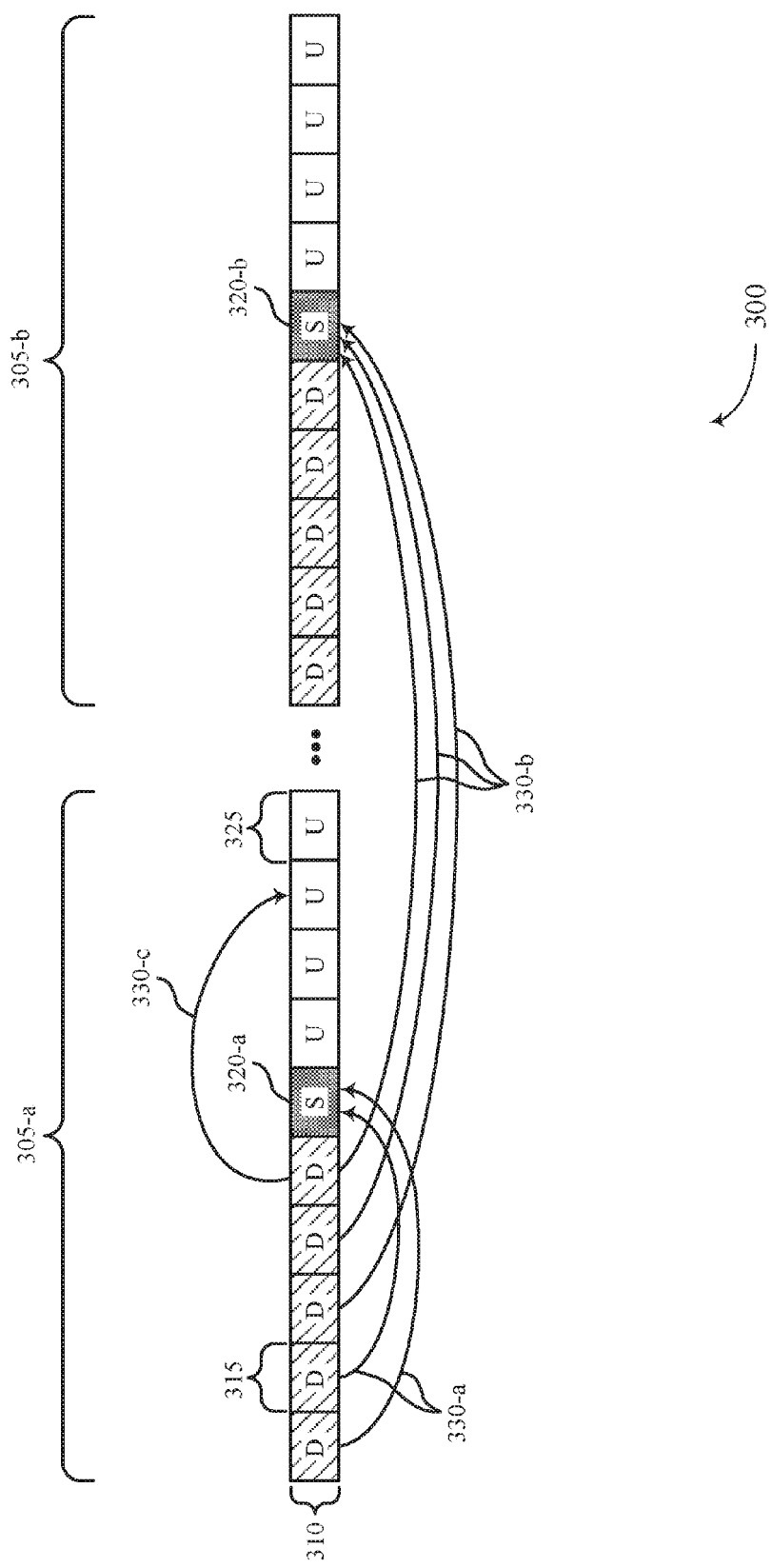
FIG. 3 illustrates examples of transmission opportunities (TxOPs) that support HARQ feedback in unlicensed RF spectrum in accordance with various aspects of the present disclosure.

FIG. 3 illustrates examples of TxOPs 300 that support HARQ feedback in unlicensed RF spectrum in accordance with various aspects of the present disclosure. In some cases, TxOPs 300 may represent aspects of communications between a UE 115 and base station 105 as described with reference to FIGS. 1 and 2. TxOPs 300 illustrate multiple TxOPs 305 that enable the transmission of HARQ feedback using different channels according to a mode of operation.

A TxOP 305 may include a radio frame 310 that includes a number of downlink subframes 315 scheduled for downlink transmissions, special subframes 320, and uplink subframes 325 scheduled for uplink transmissions. These subframes may be used to carry control or shared channels to facilitate the transmission of grants, triggers, and feedback messages. For example, a downlink subframe 315 may include an uplink grant used by a UE 115 to transmit HARQ feedback using an sPUCCH or ePUSCH in a special subframe 320 or an uplink subframe 325, respectively. Similarly, a trigger may be included in a downlink subframe 315 to enable HARQ feedback in an sPUCCH included in an uplink subframe 325.

When communicating in unlicensed spectrum, polled and unpolled operations may determine different techniques used by a wireless device for feedback. For example, in polled operation, a base station 105 may explicitly indicate when and how a UE 115 may provide HARQ feedback for downlink data during a TxOP 305. In unpolled operation, a UE 115 may autonomously send HARQ feedback to the base station 105.

In some cases, polled and unpolled operations may be used to reduce unnecessary redundancy incurred when a number of different channels are used to provide feedback at different times. For instance, in unpolled operation, different channels (such as a trigger-based sPUCCH, ePUCCH, or ePUSCH) may be used for HARQ feedback. Additionally or alternatively, polled operation may use a grant-based ePUCCH. In such cases, a UE 115 may send HARQ feedback 330 at the earliest opportunity.

For example, during a first TxOP 305-a, a UE 115 may receive downlink data during a downlink subframe 315, and provide HARQ feedback 330-a using an sPUCCH in special subframe 320-a based on a trigger. HARQ feedback 330-b for downlink data received during other downlink subframes 315 may be transmitted during a second TxOP 305-b in an sPUCCH in special subframe 320-b. As another example, a UE 115 may receive a trigger to transmit HARQ feedback 330-c during an uplink subframe 325. Similarly, the UE 115 may be provided a grant during a downlink subframe 315, and HARQ feedback 330-c may be provided in an ePUSCH in an uplink subframe 325. In some cases, the HARQ feedback may be sent during an uplink subframe 325 that is N+4 subframes from the subframe where the downlink data was received.

Following the transmission of HARQ feedback, buffers of the HARQ feedback may be cleared. Separate HARQ buffers may be maintained for polled and unpolled operations, and the UE may determine to clear the buffers (e.g., setting ACK/NACK bits to NACK and transmitting when applicable) either based on an indication from a base station or autonomously by the UE 115. For example, a UE may clear a buffer on its own when feedback is transmitted using an sPUCCH, whereas the UE 115 may wait for a trigger to clear the buffer when feedback is transmitted using ePUCCH.

Figure 4:
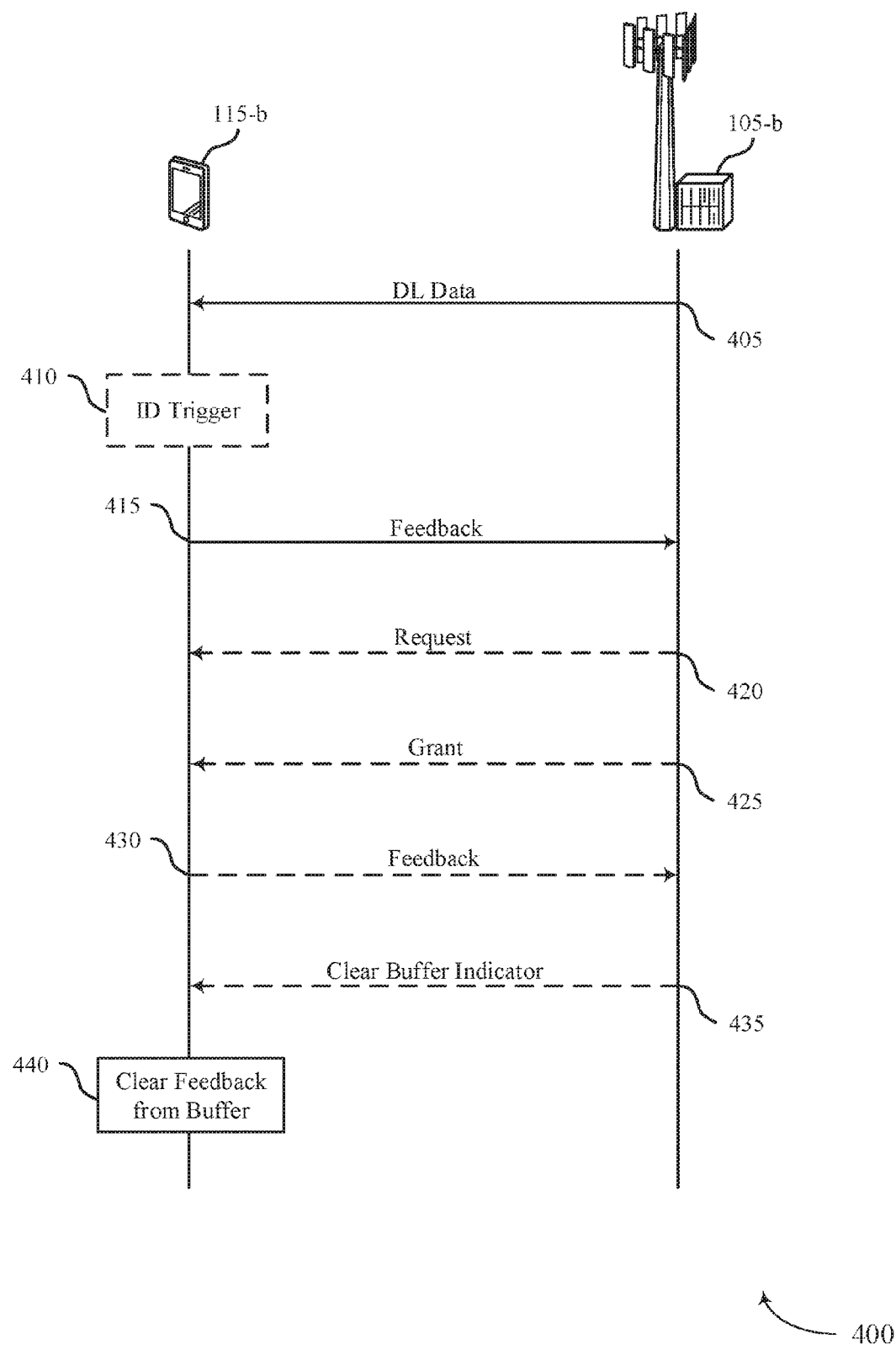
FIGS. 4 and 5 illustrate examples of process flows in a system that support HARQ feedback in unlicensed RF spectrum in accordance with various aspects of the present disclosure.

FIG. 4 illustrates an example of a process flow 400 that supports HARQ feedback in unlicensed RF spectrum in accordance with various aspects of the present disclosure. Process flow 400 may include UE 115-b and base station 105-b, which may be examples of the corresponding devices described with reference to FIGS. 1 and 2. Process flow 400 may illustrate examples of efficient HARQ feedback techniques using different feedback operations, such as polled and unpolled (i.e., autonomous) operations.

At 405, base station 105-b may transmit, and UE 115-b may receive, a downlink data transmission using resources of a shared RF spectrum band during a first TxOP. At 410, UE 115-b may optionally identify a trigger for transmitting additional HARQ feedback. At 415, UE 115-b may transmit HARQ feedback in response to the downlink data transmission—or, in the cases where the trigger was identified, based on the trigger—during the first TxOP or a second TxOP.

At 420, UE 115-b may optionally receive a request from base station 105-b to transmit HARQ feedback, and at 425, UE 115-b may optionally receive a grant of resources for the HARQ feedback from base station 105-b. In some cases, the grant of resources may include an indication of an identifier for a HARQ process of the HARQ feedback. The request may, in some cases, include a request to retransmit a subset of previously transmitted HARQ feedback.

At 430, UE 115-b may, in the cases where it received the request, transmit HARQ feedback in response to the downlink data transmission and the request. UE 115-*b* may transmit the HARQ feedback using the resources in response to the request. In one example, at 430, the HARQ feedback transmitted by UE 115-*b* may be the same HARQ feedback as transmitted at 415, but additionally transmitted in response to the request or the trigger, and UE 115-*b* may clear the additional HARQ feedback from an additional buffer based on transmitting the additional HARQ feedback.

At 435, base station 105-*b* may optionally transmit, and UE 115-*b* may receive, an indication to clear a buffer of the HARQ feedback during the second TxOP or a third TxOP. At 440, UE 115-*b* may clear the HARQ feedback from the buffer, for example, based transmitting the feedback or based on receiving the indication to clear the buffer. In some examples, the buffer is associated with a request-based feedback mode and the additional buffer is associated with an autonomous feedback mode. In some cases, the buffer includes a common buffer for an sPUCCH, an ePUCCH, or a PUSCH. Additionally or alternatively, UE 115-*b* may determine to clear the buffer according to a predetermined periodicity.

Figure 5:
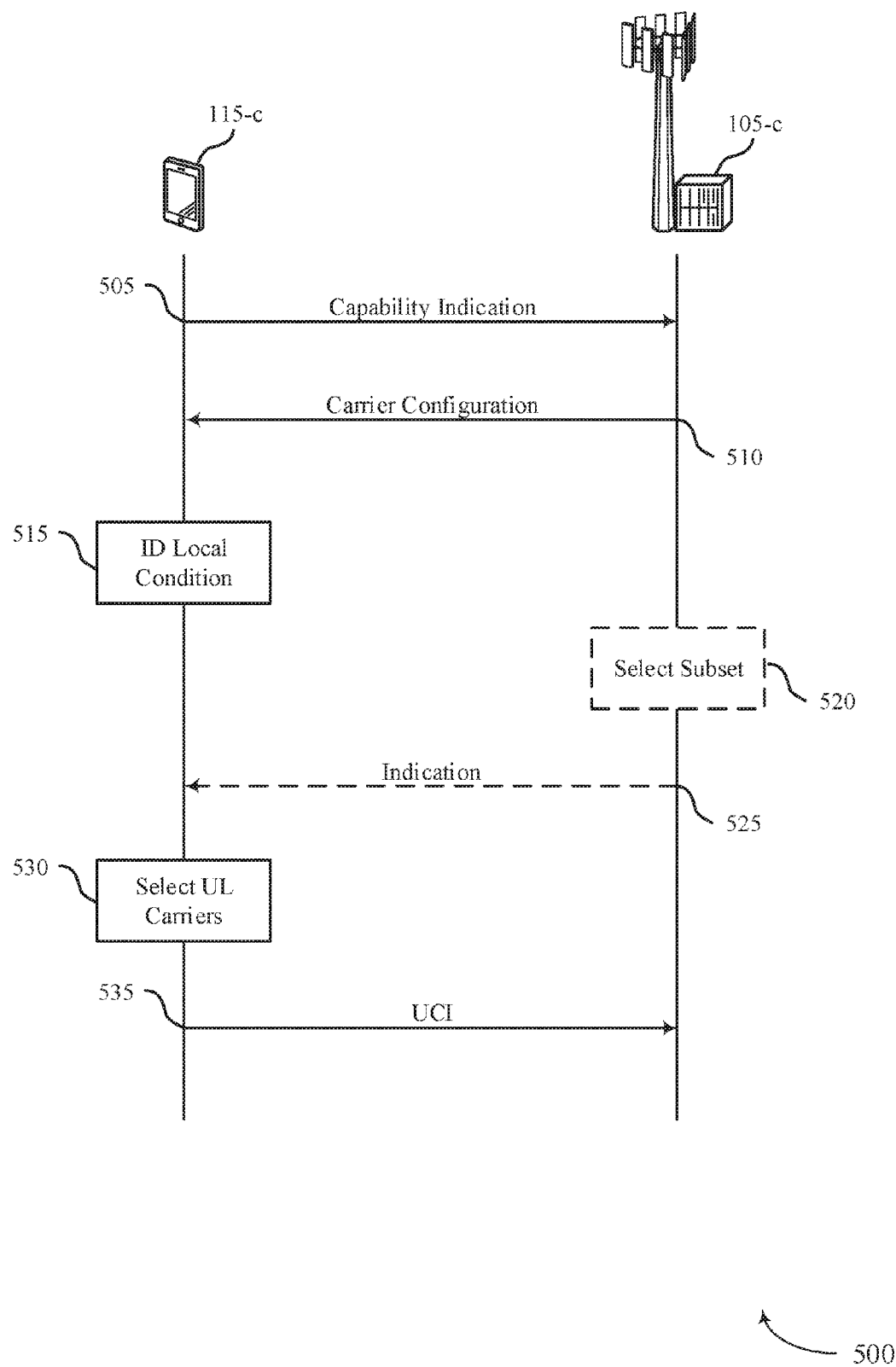

FIG. 5 illustrates an example of a process flow 500 that supports HARQ feedback in unlicensed RF spectrum in accordance with various aspects of the present disclosure. Process flow 500 may include UE 115-*c* and base station 105-*c*, which may be examples of the corresponding devices described with reference to FIGS. 1 and 2. Process flow 500 may illustrate examples of efficient transmission of UCI in a multi-carrier deployment.

At 505, UE 115-*c* may transmit, and base station 105-*c* may receive, an indication (e.g., a capability indication) of a quantity of uplink carriers of a shared RF spectrum band for which UCI transmissions are supported. For example, the indication may indicate a quantity of uplink carriers that can support simultaneous transmissions of UCI. At 510, UE 115-*c* may receive a carrier configuration that includes a set of uplink carriers for UCI transmissions based on the indication. At 515, UE 115-*c* may identify a local condition, where the local condition may include a power consumption condition of UE 115-*c*, a power headroom condition of UE 115-*c*, an interference profile of devices neighboring UE 115-*c*, a simultaneous transmission condition, or a combination thereof. At 520, base station 105-*c* may select a subset of the uplink carriers for UCI transmissions, where the subset includes fewer uplink carriers than the set, and at 525, UE 115-*c* may receive an indication of the subset of uplink carriers from base station 105-*c*. In some cases, the indication is received via RRC signaling or in a resource grant.

At 530, UE 115-*c* may select a subset of the uplink carriers for UCI transmissions, where the subset includes fewer uplink carriers than the set of uplink carriers for UCI. In some examples, the subset of the uplink carriers is selected by UE 115-*c* based on the local condition. Additionally or alternatively, the subset of uplink carriers may be selected based on the received indication from base station 105-*c*. At 535, UE 115-*c* may transmit UCI to base station 105-*c* using the subset of uplink carriers. In some cases, the UCI includes feedback for a plurality of downlink carriers of the carrier configuration. The UCI may include an indicator of downlink carriers of the carrier configuration.

In some cases, UE 115-*c* may receive a downlink control message and identify a resource interlace for transmitting the UCI based on the downlink control message and one or more additional parameters. In some cases, the resource interlace includes at least one of a cyclic shift or Walsh code index. Additionally or alternatively, the one or more additional parameters may include at least one of a CCE of a C-PDCCH or an indicator received via RRC signaling. In some examples, base station 105-*c* may transmit, and UE 115-*c* may receive, a payload configuration for the UCI, where the payload configuration includes an indication at least one of hybrid HARQ feedback, an SR, CSI, an RI, a PMI, or a hidden node interference indicator.

Figure 6:
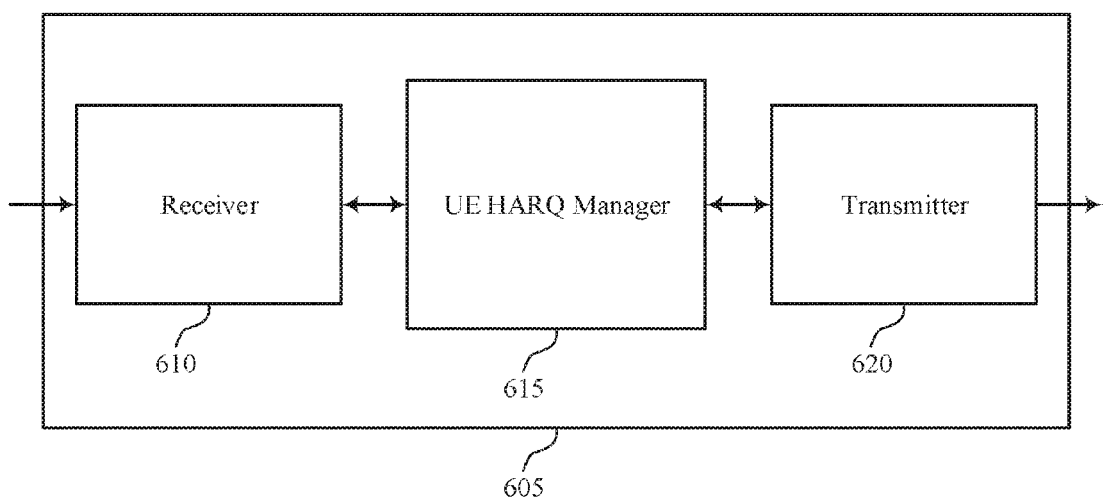
FIGS. 6 through 8 show block diagrams of a device that supports HARQ feedback in unlicensed RF spectrum in accordance with various aspects of the present disclosure.

FIG. 6 shows a block diagram 600 of a wireless device 605 that supports HARQ feedback in unlicensed RF spectrum in accordance with various aspects of the present disclosure. Wireless device 605 may be an example of aspects of a UE 115 as described with reference to FIGS. 1 and 2. Wireless device 605 may include receiver 610, UE HARQ manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to HARQ feedback in unlicensed RF spectrum, etc.). Information may be passed on to other components of the device. The receiver 610 may be an example of aspects of the transceiver 935 as described with reference to FIG. 9. In some cases, receiver 610 may receive a downlink data transmission using resources of a shared RF spectrum band during a first TxOP. Additionally, receiver 610 may receive a downlink control message.

UE HARQ manager 615 may be an example of aspects of the UE HARQ manager 915 described with reference to FIG. 9. UE HARQ manager 615 may transmit HARQ feedback during the first TxOP or a second TxOP in response to the downlink data transmission. UE HARQ manager 615 may determine to clear a buffer of the HARQ feedback after transmitting the HARQ feedback (e.g., based on receiving an indication during the second TxOP or a third TxOP), and may clear the HARQ feedback from the buffer based on the determination to clear the buffer. Additionally, UE HARQ manager 615 may transmit an indication of a quantity of uplink carriers of a shared RF spectrum band for which UCI transmissions are supported, receive a carrier configuration that includes a set of uplink carriers for UCI transmissions based on the indication, and select a subset of the uplink carriers for UCI transmissions, where the subset includes fewer uplink carriers than the set of uplink carriers for UCI.

Transmitter 620 may transmit signals generated by other components of the device. In some examples, the transmitter 620 may be collocated with a receiver 610 in a transceiver module. For example, the transmitter 620 may be an example of aspects of the transceiver 935 as described with reference to FIG. 9. The transmitter 620 may include a single antenna, or it may include a set of antennas. Transmitter 620 may transmit UCI using the subset of the uplink carriers. In some cases, the UCI may include feedback for a set of downlink carriers of the carrier configuration. In some cases, the UCI includes an indicator of downlink carriers of the carrier configuration.

Figure 7:
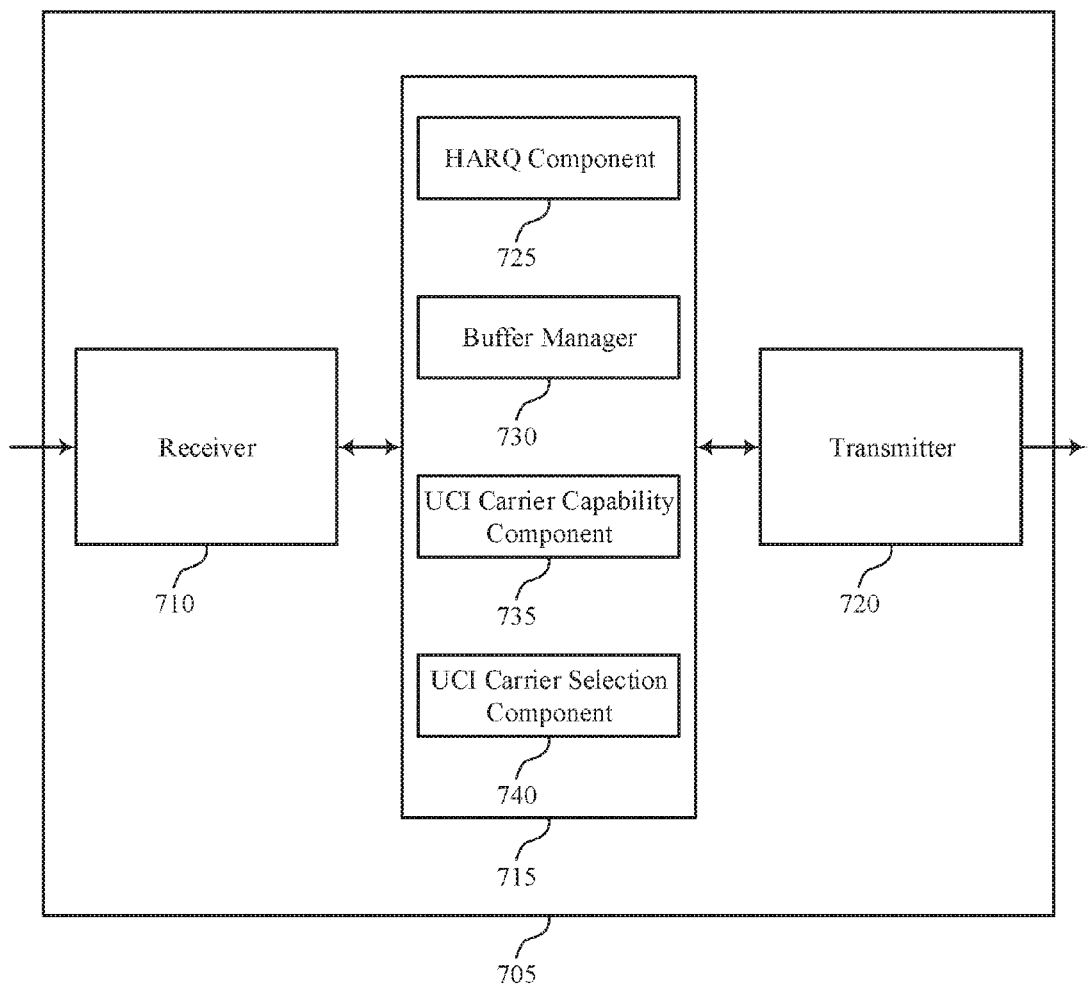

FIG. 7 shows a block diagram 700 of a wireless device 705 that supports HARQ feedback in unlicensed RF spectrum in accordance with various aspects of the present disclosure. Wireless device 705 may be an example of aspects of a wireless device 605 or a UE 115 as described with reference to FIGS. 1, 2, and 6. Wireless device 705 may include receiver 710, UE HARQ manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, information related to HARQ feedback in unlicensed RF spectrum, etc.). Information may be passed on to other components of the device. The receiver 710 may be an example of aspects of the transceiver 935 as described with reference to FIG. 9.

UE HARQ manager 715 may be an example of aspects of the UE HARQ manager 615 or the UE HARQ manager 915 as described with reference to FIGS. 6 and 9. UE HARQ manager 715 may also include HARQ component 725, buffer manager 730, UCI carrier capability component 735, and UCI carrier selection component 740. HARQ component 725 may transmit HARQ feedback in response to a downlink data transmission during a first TxOP or a second TxOP and transmit additional HARQ feedback based on a trigger.

Buffer manager 730 may determine to clear a buffer of the HARQ feedback after transmitting the HARQ feedback (e.g., based on receiving an indication to clear the buffer during the second TxOP or a third TxOP). Buffer manager 730 may clear the HARQ feedback from the buffer based on determining to clear the buffer. In some cases, buffer manager 730 may clear the additional HARQ feedback from an additional buffer based on transmitting the additional HARQ feedback or may clear the buffer according to a predetermined periodicity. In some cases, the buffer is associated with a request-based feedback mode and the additional buffer is associated with an autonomous feedback mode. In some cases, the buffer includes a common buffer for an sPUCCH, an ePUCCH, or a PUSCH.

UCI carrier capability component 735 may transmit an indication of a quantity of uplink carriers of a shared RF spectrum band for which UCI transmissions are supported. UCI carrier selection component 740 may receive a carrier configuration that includes a set of uplink carriers for UCI transmissions based on the indication and select a subset of the uplink carriers for UCI transmissions, where the subset includes fewer uplink carriers than the set of uplink carriers for UCI. In some cases, UCI carrier selection component 740 may receive an indication of the subset of uplink carriers from a base station, where the subset of the uplink carriers is selected based on the received indication. In some cases, the received indication is received via RRC signaling or in a resource grant.

Transmitter 720 may transmit signals generated by other components of the device. In some examples, the transmitter 720 may be collocated with a receiver 710 in a transceiver module. For example, the transmitter 720 may be an example of aspects of the transceiver 935 as described with reference to FIG. 9. The transmitter 720 may include a single antenna, or it may include a set of antennas.

Figure 8:
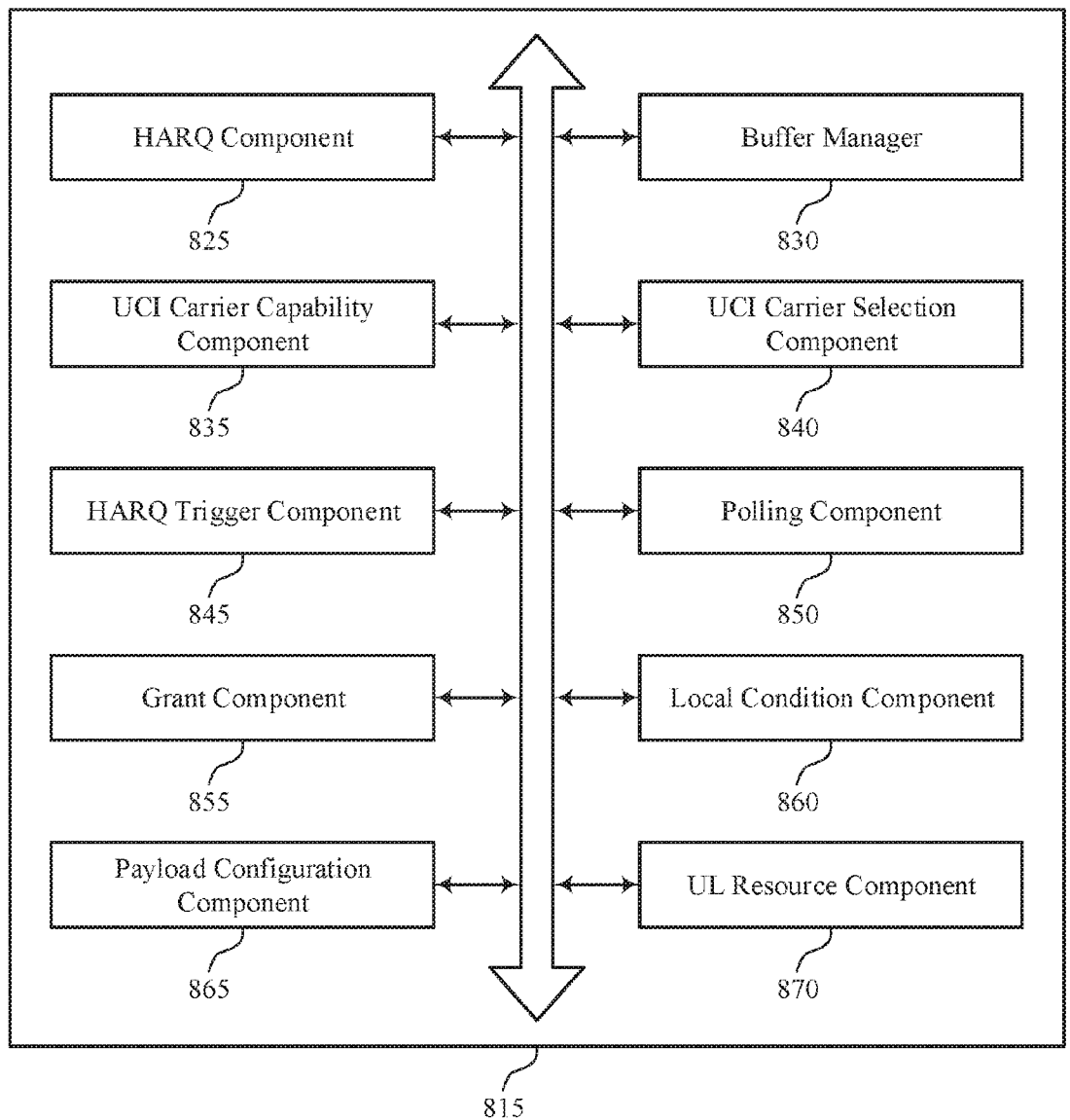

FIG. 8 shows a block diagram 800 of a UE HARQ manager 815 that supports HARQ feedback in unlicensed RF spectrum in accordance with various aspects of the present disclosure. The UE HARQ manager 815 may be an example of aspects of a UE HARQ manager 615, a UE HARQ manager 715, or a UE HARQ manager 915 as described with reference to FIGS. 6, 7, and 9. The UE HARQ manager 815 may include HARQ component 825, buffer manager 830, UCI carrier capability component 835, UCI carrier selection component 840, HARQ trigger component 845, polling component 850, grant component 855, local condition component 860, payload configuration component 865, and uplink resource component 870. Each of these modules may communicate, directly or indirectly, with one another (e.g., via one or more buses).

HARQ component 825 may transmit HARQ feedback in response to a downlink data transmission during a first TxOP or a second TxOP and transmit additional HARQ feedback based on a trigger. Buffer manager 830 may determine to clear a buffer of the HARQ feedback after transmitting the HARQ. Buffer manager 830 may clear the HARQ feedback from the buffer based on determining to clear the buffer, and may clear the additional HARQ feedback from an additional buffer based on transmitting the additional HARQ feedback. In some cases, buffer manager 830 may clear the buffer according to a predetermined periodicity. In some cases, the buffer is associated with a request-based feedback mode and the additional buffer is associated with an autonomous feedback mode. In some cases, the buffer includes a common buffer for an sPUCCH, an ePUCCH, or a PUSCH.

UCI carrier capability component 835 may transmit an indication of a quantity of uplink carriers of a shared RF spectrum band for which UCI transmissions are supported. UCI carrier selection component 840 may receive a carrier configuration that includes a set of uplink carriers for UCI transmissions based on the indication, select a subset of the uplink carriers for UCI transmissions, where the subset includes fewer uplink carriers than the set of uplink carriers for UCI, and receive an indication of the subset of uplink carriers from a base station, where the subset of the uplink carriers is selected based on the received indication. In some cases, the received indication is received via RRC signaling or in a resource grant.

HARQ trigger component 845 may identify the trigger for transmitting the additional HARQ feedback and identify a trigger for transmitting the HARQ feedback, where the HARQ feedback is transmitted based at least part on identifying the trigger. Polling component 850 may receive a request to transmit the HARQ feedback. Grant component 855 may receive a grant of resources for the HARQ feedback, where the HARQ feedback is transmitted using the resources in response to the request. In some cases, the grant of resources includes an indication of an identifier for a HARQ process of the HARQ feedback. In some cases, the request includes a request to retransmit a subset of previously transmitted feedback.

Local condition component 860 may identify a local condition of a UE, where the subset of the uplink carriers is selected by the UE based on the local condition of the UE. In some cases, the local condition may include a power consumption condition of the UE, a power headroom condition of the UE, an interference profile of devices neighboring the UE, a simultaneous transmission condition, or a combination thereof.

Payload configuration component 865 may receive a payload configuration for the UCI, where the payload configuration includes an indication of at least one of HARQ feedback, an SR, CSI, an RI, a PMI, or a hidden node interference indicator. Uplink resource component 870 may identify a resource interlace for transmitting the UCI based on a downlink control message and one or more additional parameters. In some cases, the resource interlace includes at least one of a cyclic shift or Walsh code index. In some cases, the one or more additional parameters includes at least one of a CCE of a C-PDCCH or an indicator received via RRC signaling.

Figure 9:
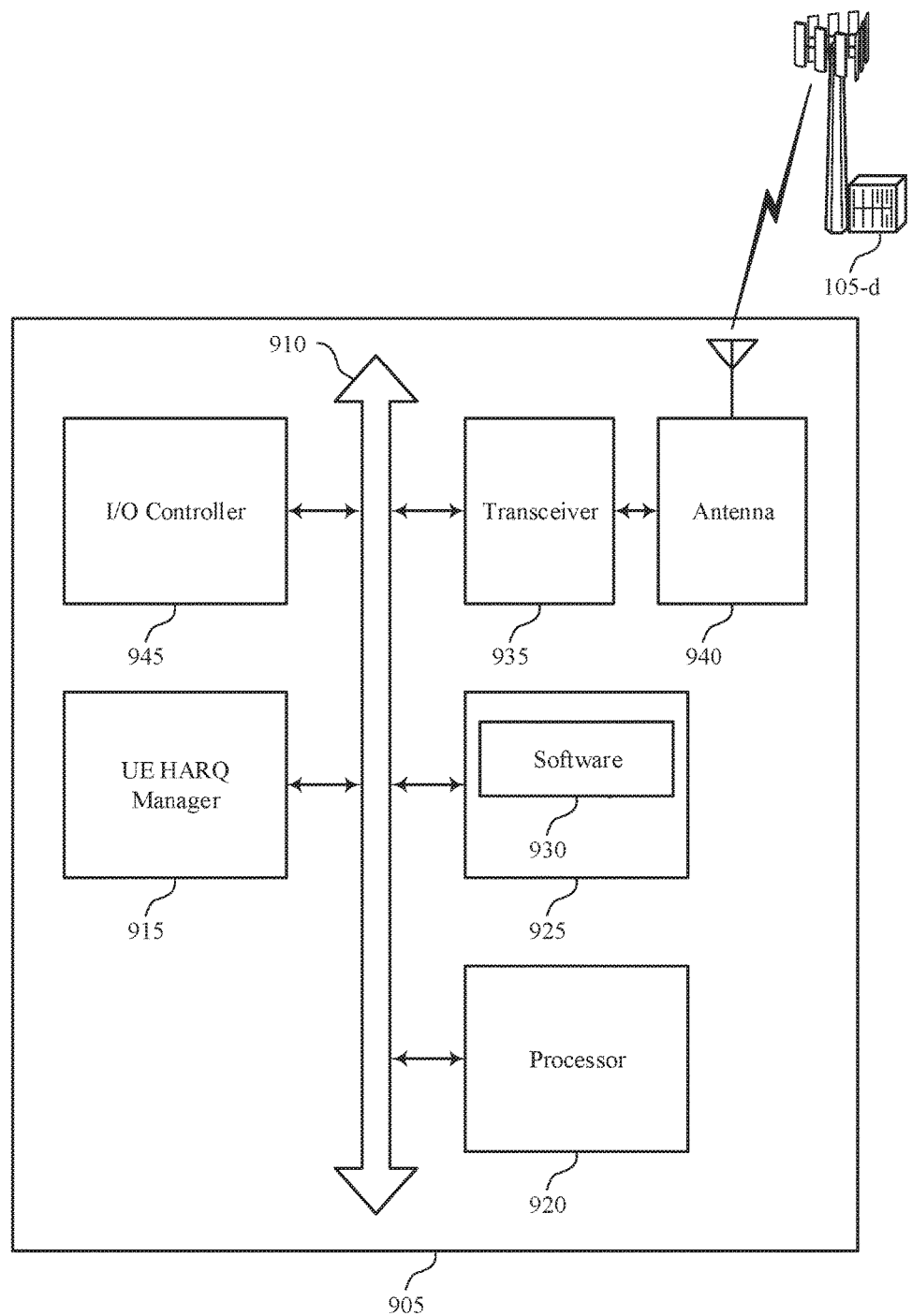
FIG. 9 illustrates a block diagram of a system including a user equipment (UE) that supports HARQ feedback in unlicensed RF spectrum in accordance with various aspects of the present disclosure.

FIG. 9 shows a diagram of a system 900 including a device 905 that supports HARQ feedback in unlicensed RF spectrum in accordance with various aspects of the present disclosure. Device 905 may be an example of or include the components of wireless device 605, wireless device 705, or a UE 115 as described above, e.g., with reference to FIGS. 1, 2, 6, and 7.

Device 905 may include components for bi-directional voice and data communications including components for transmitting and receiving communications, including UE HARQ manager 915, processor 920, memory 925, software 930, transceiver 935, antenna 940, and I/O controller 945.

Processor 920 may include an intelligent hardware device (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory (e.g., memory 925) to perform various functions (e.g., functions or tasks supporting HARQ feedback in unlicensed RF spectrum).

Memory 925 may include random access memory (RAM) and read only memory (ROM). Memory 925 may store computer-readable, computer-executable software 930 including instructions that, when executed, cause processor 920 to perform various functions described herein. In some cases, memory 925 can contain, among other things, a Basic Input-Output system (BIOS) which may control basic hardware and/or software operation such as the interaction with peripheral components or devices.

Software 930 may include code to implement aspects of the present disclosure, including code to support HARQ feedback in unlicensed RF spectrum. Software 930 can be stored in a non-transitory computer-readable medium such as system memory or other memory. In some cases, software 930 may not be directly executable by processor 920 but may cause a computer (e.g., when compiled and executed) to perform functions described herein.

Transceiver 935 may communicate bi-directionally, via one or more antennas 940, wired, or wireless links as described above. For example, the transceiver 935 may represent a wireless transceiver and may communicate bi-directionally with another wireless transceiver (e.g., a wireless transceiver that is a component of a base station, such as base station 105-*d*). The transceiver 935 may also include a modem to modulate the packets and provide the modulated packets to the antennas 940 for transmission, and to demodulate packets received from the antennas 940.

In some cases, the wireless device may include a single antenna 940. However, in some cases the device may have more than one antenna 940, which may be capable of concurrently transmitting or receiving multiple wireless transmissions. I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
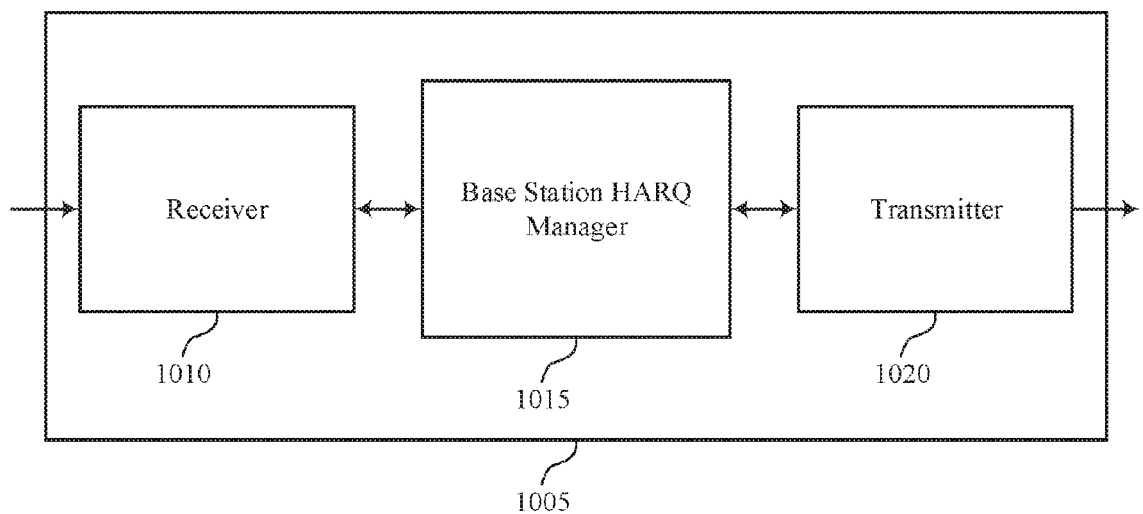
FIGS. 10 through 12 show block diagrams of a device that supports HARQ feedback in unlicensed RF spectrum in accordance with various aspects of the present disclosure.

FIG. 10 shows a block diagram 1000 of a wireless device 1005 that supports HARQ feedback in unlicensed RF spectrum in accordance with various aspects of the present disclosure. Wireless device 1005 may be an example of aspects of a base station 105 as described with reference to FIGS. 1 and 2. Wireless device 1005 may include receiver 1010, base station HARQ manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to HARQ feedback in unlicensed RF spectrum, etc.). Information may be passed on to other components of the device. The receiver 1010 may be an example of aspects of the transceiver 1335 as described with reference to FIG. 13. Receiver 1010 may receive UCI using a subset of a set of uplink carriers.

Base station HARQ manager 1015 may be an example of aspects of the base station HARQ manager 1315 as described with reference to FIG. 13. Base station HARQ manager 1015 may receive HARQ feedback in response to a downlink data transmission during a first TxOP or a second TxOP, transmit an indication to clear a buffer of the HARQ feedback during the second TxOP or a third TxOP, receive an indication of a quantity of uplink carriers of a shared RF spectrum band for which UCI transmissions are supported, and transmit a carrier configuration that includes the set of uplink carriers for UCI based on the indication.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 as described with reference to FIG. 13. The transmitter 1020 may include a single antenna, or it may include a set of antennas. Transmitter 1020 may transmit the downlink data transmission using resources of a shared RF spectrum band during the first TxOP, transmit an additional downlink data transmission based on a determination, transmit an indication of the subset to a UE, and transmit a downlink control message.

Figure 11:
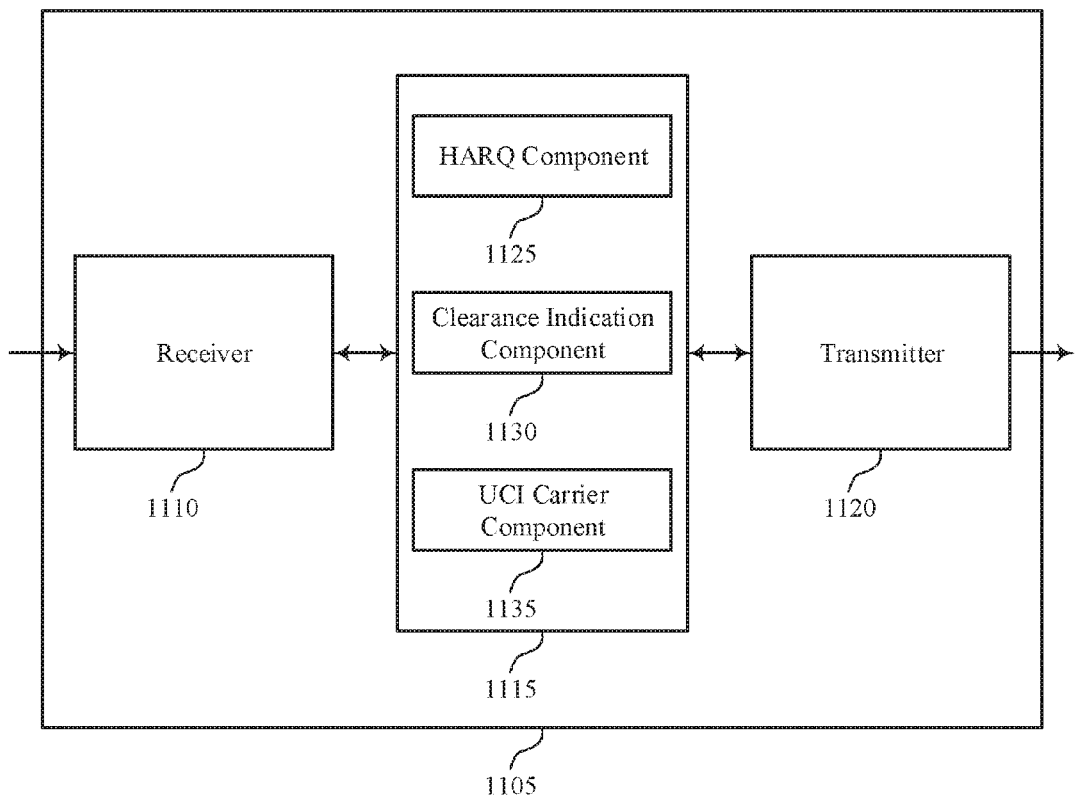

FIG. 11 shows a block diagram 1100 of a wireless device 1105 that supports HARQ feedback in unlicensed RF spectrum in accordance with various aspects of the present disclosure. Wireless device 1105 may be an example of aspects of a wireless device 1005 or a base station 105 as described with reference to FIGS. 1, 2, and 10. Wireless device 1105 may include receiver 1110, base station HARQ manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, information related to HARQ feedback in unlicensed RF spectrum, etc.). Information may be passed on to other components of the device. The receiver 1110 may be an example of aspects of the transceiver 1335 as described with reference to FIG. 13.

Base station HARQ manager 1115 may be an example of aspects of the base station HARQ manager 1315 as described with reference to FIG. 13. Base station HARQ manager 1115 may also include HARQ component 1125, clearance indication component 1130, and UCI carrier component 1135.

HARQ component 1125 may receive HARQ feedback in response to a downlink data transmission during a first TxOP or a second TxOP, receive additional HARQ feedback based on a trigger, and determine that an identifier for a HARQ process associated with the downlink data transmission is unacknowledged, where a request for HARQ feedback is transmitted based on the determination.

Clearance indication component 1130 may transmit an indication to clear a buffer of the HARQ feedback during the second TxOP or a third TxOP. In some cases, the buffer includes a common buffer for an sPUCCH, an ePUCCH, or a PUSCH. UCI carrier component 1135 may receive an indication of a quantity of uplink carriers of a shared RF spectrum band for which UCI transmissions are supported, transmit a carrier configuration that includes a set of uplink carriers for UCI based on the indication, and select a subset of the uplink carriers for UCI transmissions, where the subset includes fewer uplink carriers than the set for UCI transmissions. In some cases, the indication of the subset includes RRC signaling or a resource grant.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 as described with reference to FIG. 13. The transmitter 1120 may include a single antenna, or it may include a set of antennas.

Figure 12:
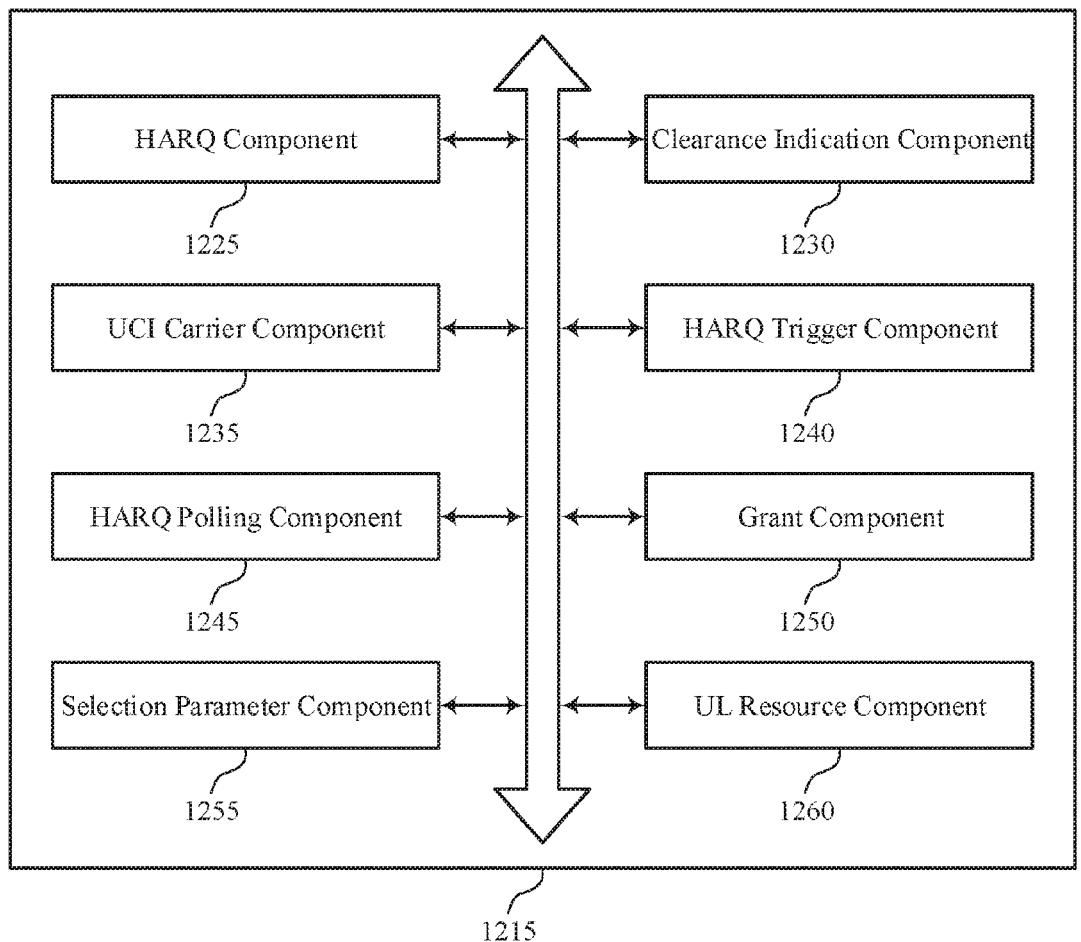

FIG. 12 shows a block diagram 1200 of a base station HARQ manager 1215 that supports HARQ feedback in unlicensed RF spectrum in accordance with various aspects of the present disclosure. The base station HARQ manager 1215 may be an example of aspects of a base station HARQ manager 1015, 1115, or 1315 as described with reference to FIGS. 10, 11, and 13. The base station HARQ manager 1215 may include HARQ component 1225, clearance indication component 1230, UCI carrier component 1235, HARQ trigger component 1240, HARQ polling component 1245, grant component 1250, selection parameter component 1255, and uplink resource component 1260. Each of these modules may communicate, directly or indirectly, with one another (e.g., via one or more buses).

HARQ component 1225 may receive HARQ feedback in response to a downlink data transmission during a first TxOP or a second TxOP, and may receive additional HARQ feedback based on a trigger. HARQ component 1225 may also determine that an identifier for a HARQ process associated with the downlink data transmission is unacknowledged, where the request for HARQ feedback is transmitted based on the determination.

Clearance indication component 1230 may transmit an indication to clear a buffer of the feedback during the second TxOP or a third TxOP. In some cases, the buffer includes a common buffer for an sPUCCH, an ePUCCH, or a PUSCH. UCI carrier component 1235 may receive an indication of a quantity of uplink carriers of a shared RF spectrum band for which UCI transmissions are supported, transmit a carrier configuration that includes a set of uplink carriers for UCI based on the indication, and select a subset of the uplink carriers for UCI transmissions, where the subset includes fewer uplink carriers than the set for UCI transmissions. In some cases, the indication of the subset includes RRC signaling or a resource grant.

HARQ trigger component 1240 may identify a trigger for additional HARQ feedback. HARQ polling component 1245 may transmit a request for the HARQ feedback. Grant component 1250 may transmit a grant of resources for the HARQ feedback, where the HARQ feedback is transmitted using the resources in response to the request. Selection parameter component 1255 may identify at least one of a channel quality for the UE, a powerhead room report of the UE, or a past history of LBT success by the UE, where the subset of the uplink carriers is selected based on the identifying.

Uplink resource component 1260 may identify a resource interlace for the UCI based on the downlink control message and one or more additional parameters. In some cases, the resource interlace includes at least one of a cyclic shift or Walsh code index. In some cases, the one or more additional parameters includes at least one of a CCE of a C-PDCCH or an indicator received via RRC signaling.

Figure 13:
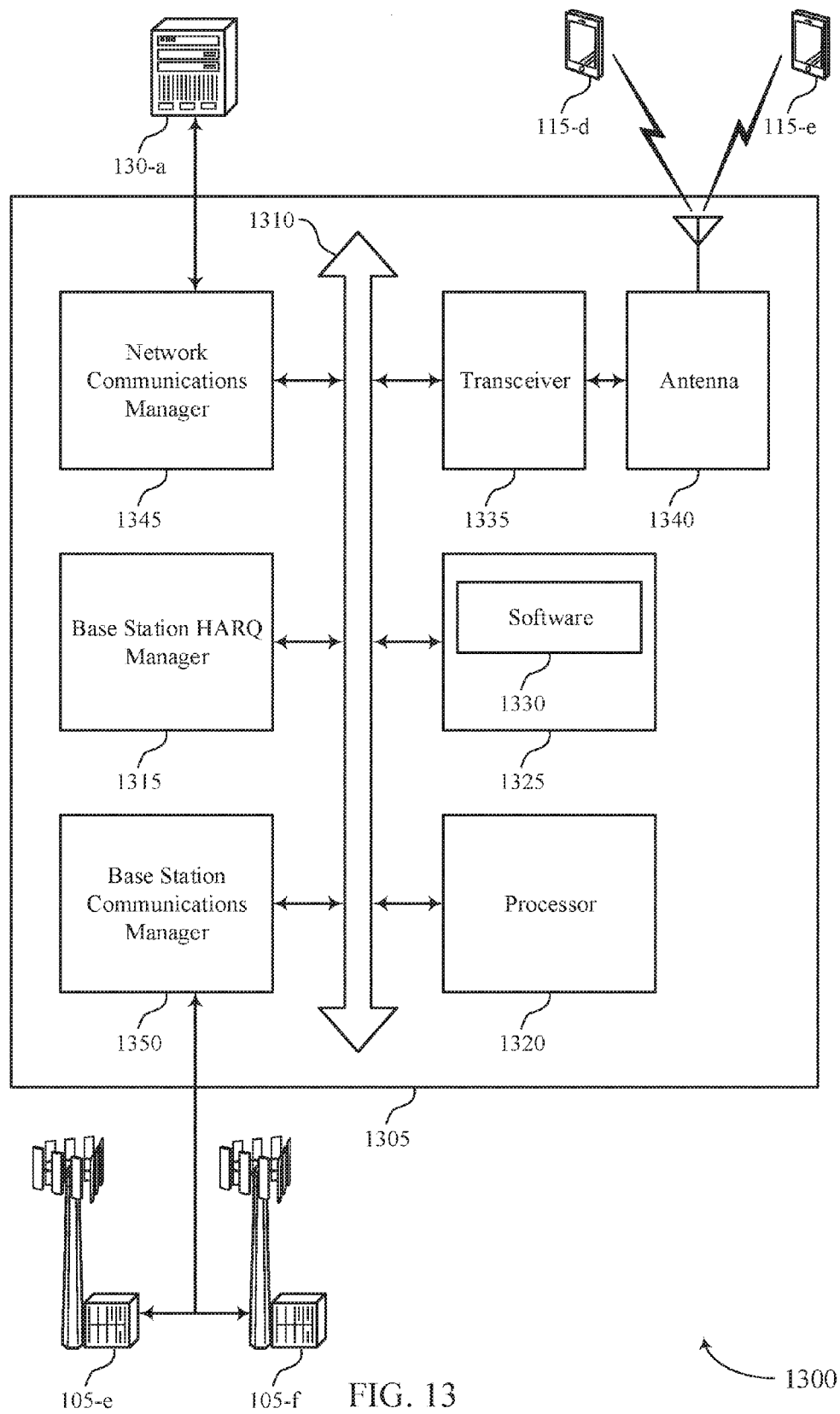
FIG. 13 illustrates a block diagram of a system including a base station that supports HARQ feedback in unlicensed RF spectrum in accordance with various aspects of the present disclosure.

FIG. 13 shows a diagram of a system 1300 including a device 1305 that supports HARQ feedback in unlicensed RF spectrum in accordance with various aspects of the present disclosure. Device 1305 may be an example of or include the components of a wireless device 1005, a wireless device 1105, or a base station 105 as described above, e.g., with reference to FIGS. 1, 2, 10, and 11.

Device 1305 may include components for bi-directional voice and data communications including components for transmitting and receiving communications, including base station HARQ manager 1315, processor 1320, memory 1325, software 1330, transceiver 1335, antenna 1340, network communications manager 1345, and base station communications manager 1350.

Processor 1320 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in memory 1325 to perform various functions (e.g., functions or tasks supporting HARQ feedback in unlicensed RF spectrum).

Memory 1325 may include RAM and ROM. Memory 1325 may store computer-readable, computer-executable software 1330 including instructions that, when executed, cause processor 1320 to perform various functions described herein. In some cases, memory 1325 can contain, among other things, a BIOS which may control basic hardware and/or software operation such as the interaction with peripheral components or devices.

Software 1330 may include code to implement aspects of the present disclosure, including code to support HARQ feedback in unlicensed RF spectrum. Software 1330 may be stored in a non-transitory computer-readable medium such as system memory or other memory. In some cases, software 1330 may not be directly executable by processor 1320 but may cause a computer (e.g., when compiled and executed) to perform functions described herein.

Transceiver 1335 may communicate bi-directionally, via one or more antennas 1340, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas 1340 for transmission, and to demodulate packets received from the antennas 1340. In some cases, the wireless device may include a single antenna 1340. However, in some cases the device may have more than one antenna 1340, which may be capable of concurrently transmitting or receiving multiple wireless transmissions (e.g., with UEs 115-*d* and 115-*e*).

Network communications manager 1345 may manage communications with core network 130-*a* (e.g., via one or more wired backhaul links). For example, the network communications module 1345 may manage the transfer of data communications for client devices, such as one or more UEs 115.

Base station communications manager 1350 may manage communications with other base stations 105 (e.g., base stations 105-*e* and 105-*f*), and may include a controller or scheduler for controlling communications with UEs 115 in cooperation with other base stations 105. For example, the base station communications manager 1350 may coordinate scheduling for transmissions to UEs 115 using various interference mitigation techniques such as beamforming or joint transmission. In some examples, base station communications manager 1350 may provide an X2 interface within an LTE/LTE-A wireless communication network technology to provide communication between base stations 105.

Figure 14:
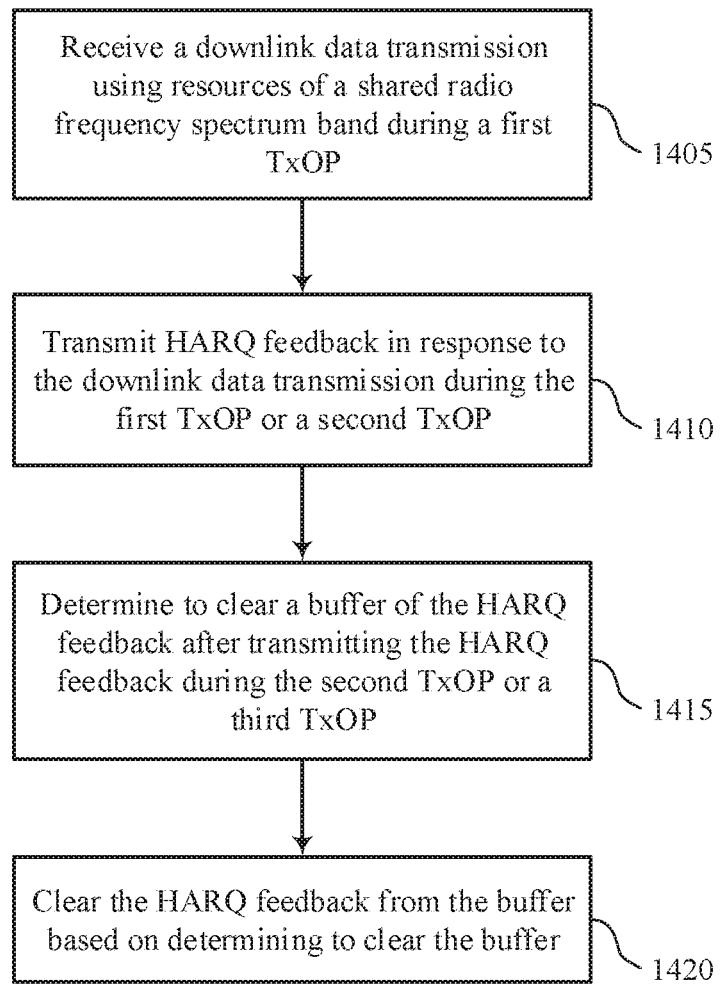
FIGS. 14 through 17 illustrate methods for HARQ feedback in unlicensed RF spectrum in accordance with various aspects of the present disclosure.

FIG. 14 shows a flowchart illustrating a method 1400 for HARQ feedback in unlicensed RF spectrum in accordance with various aspects of the present disclosure. The operations of method 1400 may be implemented by a UE 115 or its components as described herein. For example, the operations of method 1400 may be performed by a UE HARQ manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405, the UE 115 may receive a downlink data transmission using resources of a shared RF spectrum band during a first TxOP. The operations of block 1405 may be performed according to the methods described with reference to FIGS. 1 through 5. In certain examples, aspects of the operations of block 1405 may be performed by a receiver as described with reference to FIGS. 6 through 9.

At block 1410, the UE 115 may transmit HARQ feedback during the first TxOP or a second TxOP in response to the downlink data. The operations of block 1410 may be performed according to the methods described with reference to FIGS. 1 through 5. In certain examples, aspects of the operations of block 1410 may be performed by a HARQ component as described with reference to FIGS. 6 through 9.

At block 1415, the UE 115 may determine to clear a buffer of the HARQ feedback during the second TxOP or a third TxOP after transmitting the HARQ feedback. The operations of block 1415 may be performed according to the methods described with reference to FIGS. 1 through 5. In certain examples, aspects of the operations of block 1415 may be performed by a buffer manager as described with reference to FIGS. 6 through 9.

At block 1420, the UE 115 may clear the HARQ feedback from the buffer based on determining to clear the buffer. The operations of block 1420 may be performed according to the methods described with reference to FIGS. 1 through 5. In certain examples, aspects of the operations of block 1420 may be performed by a buffer manager as described with reference to FIGS. 6 through 9.

Figure 15:
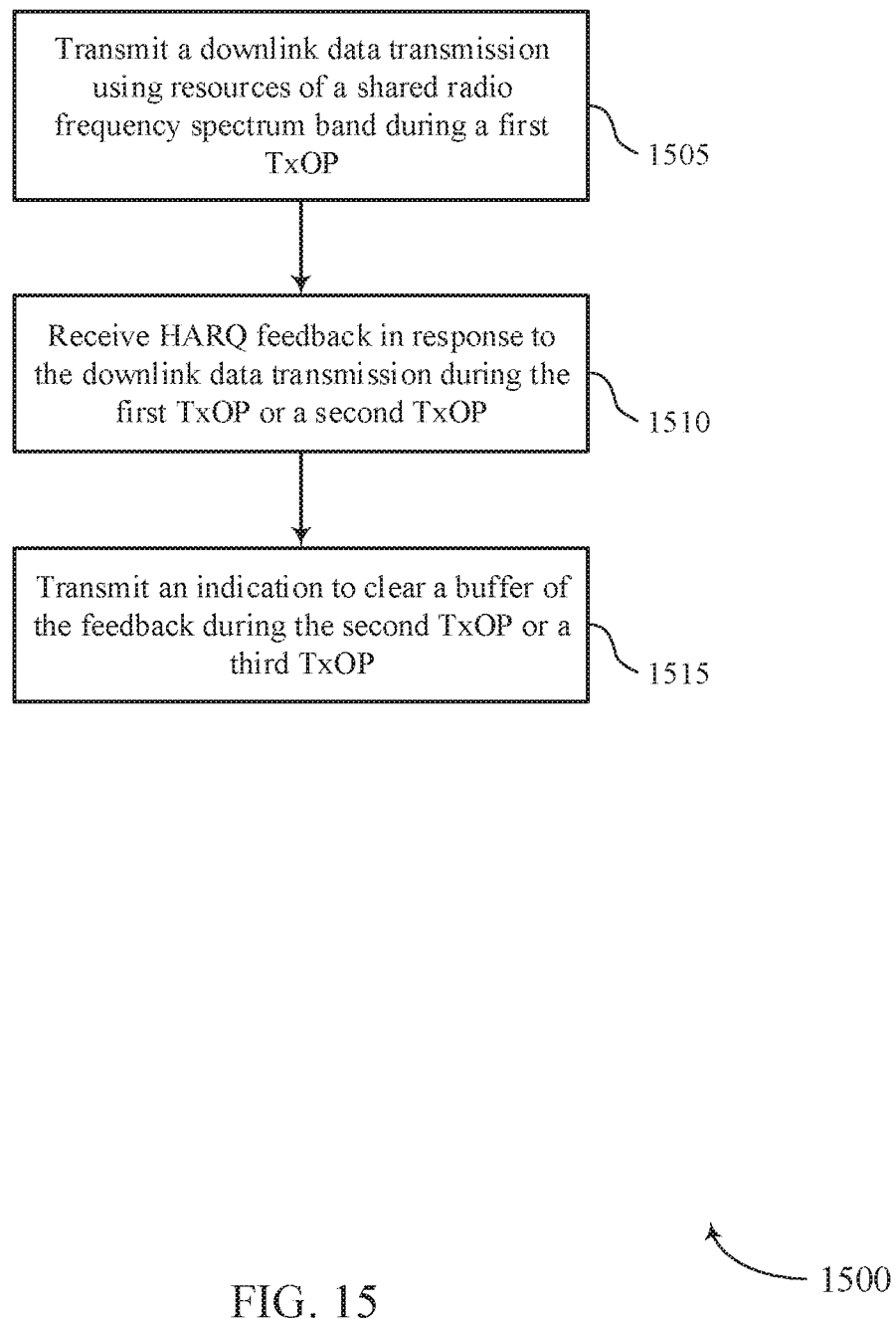

FIG. 15 shows a flowchart illustrating a method 1500 for HARQ feedback in unlicensed RF spectrum in accordance with various aspects of the present disclosure. The operations of method 1500 may be implemented by a base station 105 or its components as described herein. For example, the operations of method 1500 may be performed by a base station HARQ manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1505, the base station 105 may transmit a downlink data transmission using resources of a shared RF spectrum band during a first TxOP. The operations of block 1505 may be performed according to the methods described with reference to FIGS. 1 through 5. In certain examples, aspects of the operations of block 1505 may be performed by a transmitter as described with reference to FIGS. 10 through 13.

At block 1510, the base station 105 may receive HARQ feedback in response to the downlink data transmission during the first TxOP or a second TxOP. The operations of block 1510 may be performed according to the methods described with reference to FIGS. 1 through 5. In certain examples, aspects of the operations of block 1510 may be performed by a HARQ component as described with reference to FIGS. 10 through 13.

At block 1515, the base station 105 may, in some cases, transmit an indication to clear a buffer of the feedback during the second TxOP or a third TxOP. The operations of block 1515 may be performed according to the methods described with reference to FIGS. 1 through 5. In certain examples, aspects of the operations of block 1515 may be performed by a clearance indication component as described with reference to FIGS. 10 through 13.

Figure 16:
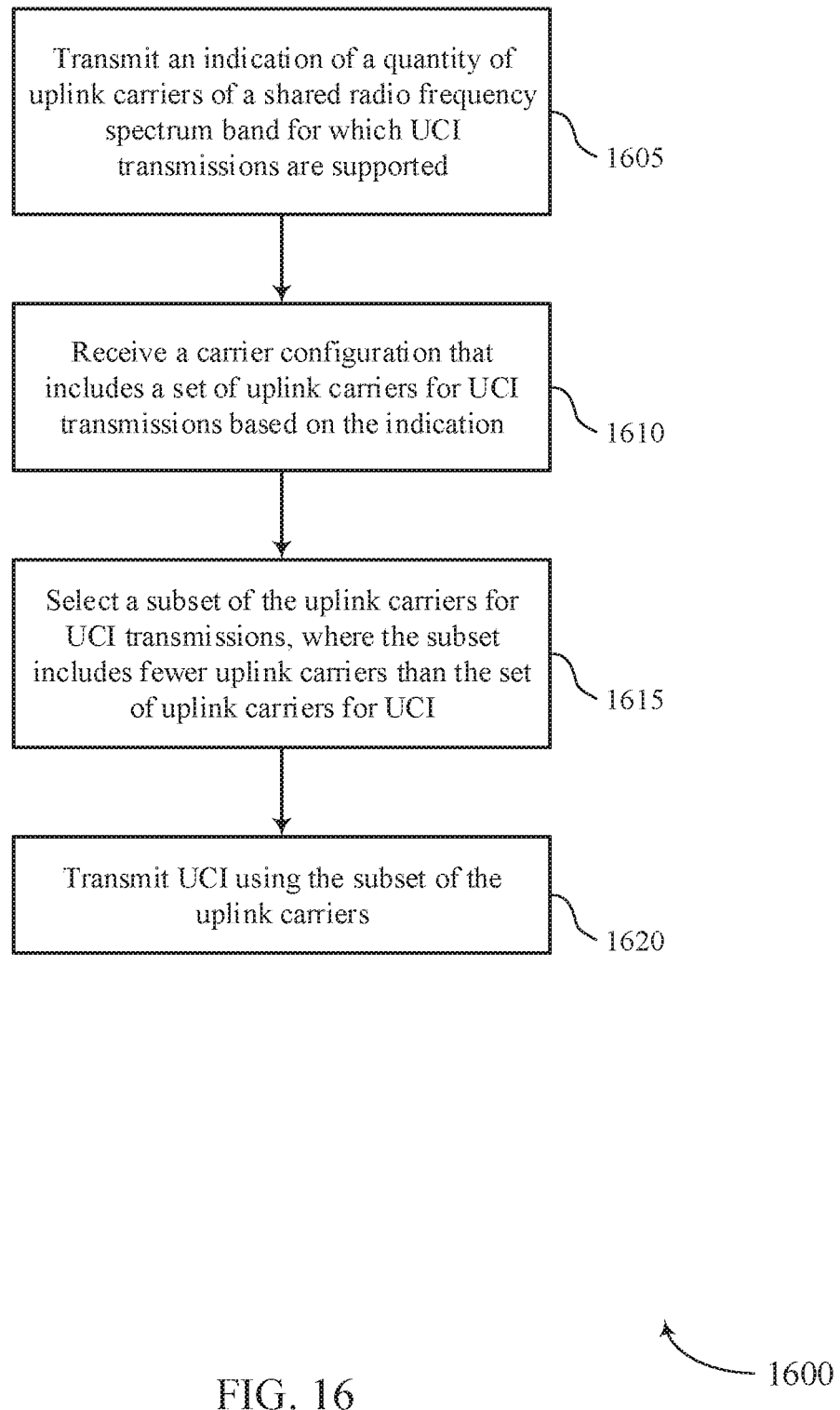

FIG. 16 shows a flowchart illustrating a method 1600 for HARQ feedback in unlicensed RF spectrum in accordance with various aspects of the present disclosure. The operations of method 1600 may be implemented by a UE 115 or its components as described herein. For example, the operations of method 1600 may be performed by a UE HARQ manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605, the UE 115 may transmit an indication of a quantity of uplink carriers of a shared RF spectrum band for which UCI transmissions are supported. The operations of block 1605 may be performed according to the methods described with reference to FIGS. 1 through 5. In certain examples, aspects of the operations of block 1605 may be performed by a UCI carrier capability component as described with reference to FIGS. 6 through 9.

At block 1610, the UE 115 may receive a carrier configuration that includes a set of uplink carriers for UCI transmissions based on the indication. The operations of block 1610 may be performed according to the methods described with reference to FIGS. 1 through 5. In certain examples, aspects of the operations of block 1610 may be performed by a UCI carrier selection component as described with reference to FIGS. 6 through 9.

At block 1615, the UE 115 may select a subset of the uplink carriers for UCI transmissions, where the subset includes fewer uplink carriers than the set of uplink carriers for UCI. The operations of block 1615 may be performed according to the methods described with reference to FIGS. 1 through 5. In certain examples, aspects of the operations of block 1615 may be performed by a UCI carrier selection component as described with reference to FIGS. 6 through 9.

At block 1620, the UE 115 may transmit UCI using the subset of the uplink carriers. The operations of block 1620 may be performed according to the methods described with reference to FIGS. 1 through 5. In certain examples, aspects of the operations of block 1620 may be performed by a transmitter as described with reference to FIGS. 6 through 9.

Figure 17:
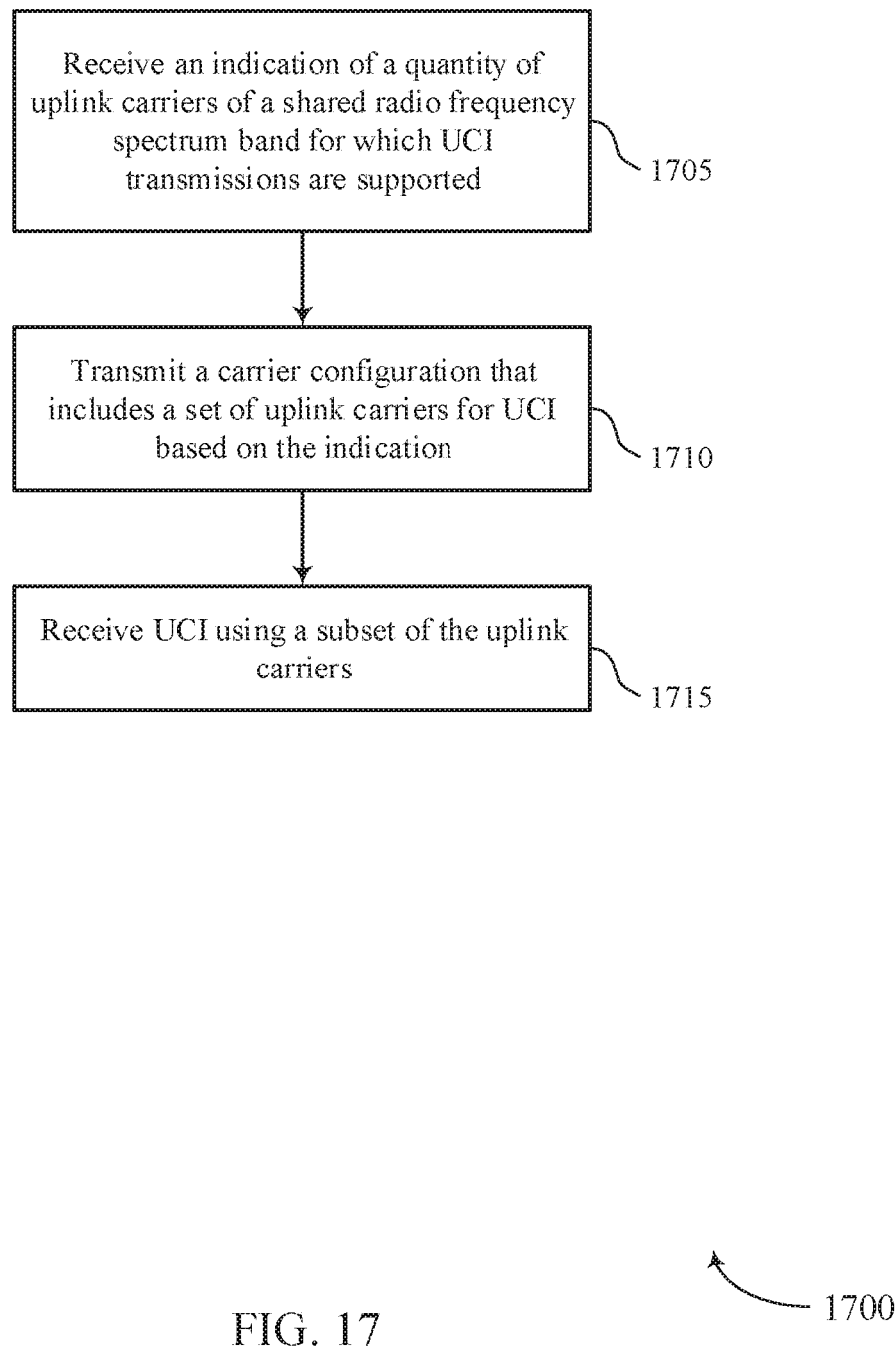

FIG. 17 shows a flowchart illustrating a method 1700 for HARQ feedback in unlicensed RF spectrum in accordance with various aspects of the present disclosure. The operations of method 1700 may be implemented by a base station 105 or its components as described herein. For example, the operations of method 1700 may be performed by a base station HARQ manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1705, the base station 105 may receive an indication of a quantity of uplink carriers of a shared RF spectrum band for which UCI transmissions are supported. The operations of block 1705 may be performed according to the methods described with reference to FIGS. 1 through 5. In certain examples, aspects of the operations of block 1705 may be performed by a UCI carrier component as described with reference to FIGS. 10 through 13.

At block 1710, the base station 105 may transmit a carrier configuration that includes a set of uplink carriers for UCI based on the indication. The operations of block 1710 may be performed according to the methods described with reference to FIGS. 1 through 5. In certain examples, aspects of the operations of block 1710 may be performed by a UCI carrier component as described with reference to FIGS. 10 through 13.

At block 1715, the base station 105 may receive UCI using a subset of the uplink carriers. The operations of block 1715 may be performed according to the methods described with reference to FIGS. 1 through 5. In certain examples, aspects of the operations of block 1715 may be performed by a receiver as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are new releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a downlink data transmission using resources of a shared radio frequency (RF) spectrum band during a first transmission opportunity (TxOP);
transmitting hybrid automatic repeat request (HARQ) feedback in response to the downlink data transmission during the first TxOP or a second TxOP;
determining, after transmitting the HARQ feedback, to clear a buffer of the HARQ feedback during the second TxOP or a third TxOP; and
clearing the HARQ feedback from the buffer based at least in part on determining to clear the buffer.

2. The method of claim 1, further comprising:
identifying a trigger for transmitting additional HARQ feedback;
transmitting the additional HARQ feedback based at least in part on the trigger; and
clearing the additional HARQ feedback from an additional buffer based at least in part on transmitting the additional HARQ feedback.

3. The method of claim 2, wherein the buffer is associated with a request-based feedback mode and the additional buffer is associated with an autonomous feedback mode.

4. The method of claim 1, further comprising:
receiving a request to transmit the HARQ feedback; and
receiving a grant of resources for the HARQ feedback, wherein the HARQ feedback is transmitted using the resources in response to the request.

5. The method of claim 4, wherein the grant of resources includes an indication of an identifier for a HARQ process of the HARQ feedback.

6. The method of claim 4, wherein the request comprises a request to retransmit a subset of previously transmitted feedback.

7. The method of claim 1, further comprising:
identifying a trigger for transmitting the HARQ feedback, wherein the HARQ feedback is transmitted based at least part on identifying the trigger.

8. The method of claim 1, wherein the buffer comprises a common buffer for a short physical uplink control channel (sPUCCH), an enhanced physical uplink control channel (ePUCCH), or a physical uplink shared channel (PUSCH).

9. The method of claim 1, further comprising:
clearing the buffer according to a predetermined periodicity.

10. A method for wireless communication, comprising:
transmitting a downlink data transmission using resources of a shared radio frequency (RF) spectrum band during a first transmission opportunity (TxOP);
receiving hybrid automatic repeat request (HARQ) feedback in response to the downlink data transmission during the first TxOP or a second TxOP; and
transmitting an indication to clear a buffer of the HARQ feedback during the second TxOP or a third TxOP.

11. The method of claim 10, further comprising:
identifying a trigger for additional HARQ feedback; and
receiving the additional HARQ feedback based at least in part on the trigger.

12. The method of claim 10, further comprising:
transmitting a request for the HARQ feedback; and
transmitting a grant of resources for the HARQ feedback, wherein the HARQ feedback is transmitted using the resources in response to the request.

13. The method of claim 12, further comprising:
determining that an identifier for a HARQ process associated with the downlink data transmission is unacknowledged, wherein the request for the HARQ feedback is transmitted based at least in part on the determination.

14. The method of claim 10, further comprising:
determining that an identifier for a HARQ process associated with the downlink data transmission is unacknowledged; and
transmitting an additional downlink data transmission based at least in part on the determination.

15. The method of claim 10, wherein the buffer comprises a common buffer for a short physical uplink control channel (sPUCCH), an enhanced physical uplink control channel (ePUCCH), or a physical uplink shared channel (PUSCH).

16. An apparatus for wireless communication, comprising:
means for receiving a downlink data transmission using resources of a shared radio frequency (RF) spectrum band during a first transmission opportunity (TxOP);
means for transmitting hybrid automatic repeat request (HARQ) feedback in response to the downlink data transmission during the first TxOP or a second TxOP;
means for determining, after transmitting the HARQ feedback, to clear a buffer of the HARQ feedback during the second TxOP or a third TxOP; and
means for clearing the HARQ feedback from the buffer based at least in part on determining to clear the buffer.

17. The apparatus of claim 16, further comprising:
means for identifying a trigger for transmitting additional HARQ feedback;
means for transmitting the additional HARQ feedback based at least in part on the trigger; and
means for clearing the additional HARQ feedback from an additional buffer based at least in part on transmitting the additional HARQ feedback.

18. The apparatus of claim 17, wherein the buffer is associated with a request-based feedback mode and the additional buffer is associated with an autonomous feedback mode.

19. The apparatus of claim 16, further comprising:
means for receiving a request to transmit the HARQ feedback; and
means for receiving a grant of resources for the HARQ feedback, wherein the HARQ feedback is transmitted using the resources in response to the request.

20. The apparatus of claim 19, wherein the grant of resources includes an indication of an identifier for a HARQ process of the HARQ feedback.

21. The apparatus of claim 19, wherein the request comprises a request to retransmit a subset of previously transmitted feedback.

22. The apparatus of claim 16, further comprising:
means for identifying a trigger for transmitting the HARQ feedback, wherein the HARQ feedback is transmitted based at least part on identifying the trigger.

23. The apparatus of claim 16, wherein the buffer comprises a common buffer for a short physical uplink control channel (sPUCCH), an enhanced physical uplink control channel (ePUCCH), or a physical uplink shared channel (PUSCH).

24. The apparatus of claim 16, further comprising:
means for clearing the buffer according to a predetermined periodicity.

25. An apparatus for wireless communication, comprising:
means for transmitting a downlink data transmission using resources of a shared radio frequency (RF) spectrum band during a first transmission opportunity (TxOP);
means for receiving hybrid automatic repeat request (HARQ) feedback in response to the downlink data transmission during the first TxOP or a second TxOP; and
means for transmitting an indication to clear a buffer of the HARQ feedback during the second TxOP or a third TxOP.

26. The apparatus of claim 25, further comprising:
means for identifying a trigger for additional HARQ feedback; and
means for receiving the additional HARQ feedback based at least in part on the trigger.

27. The apparatus of claim 25, further comprising:
means for transmitting a request for the HARQ feedback; and
means for transmitting a grant of resources for the HARQ feedback, wherein the HARQ feedback is transmitted using the resources in response to the request.

28. The apparatus of claim 27, further comprising:
means for determining that an identifier for a HARQ process associated with the downlink data transmission is unacknowledged, wherein the request for the HARQ feedback is transmitted based at least in part on the determination.

29. The apparatus of claim 25, further comprising:
means for determining that an identifier for a HARQ process associated with the downlink data transmission is unacknowledged; and
means for transmitting an additional downlink data transmission based at least in part on the determination.

30. The apparatus of claim 25, wherein the buffer comprises a common buffer for a short physical uplink control channel (sPUCCH), an enhanced physical uplink control channel (ePUCCH), or a physical uplink shared channel (PUSCH).

31. An apparatus for wireless communication, in a system comprising a processor, memory in electronic communication with the processor, and instructions stored in the memory and operable, when executed by the processor, to cause the apparatus to:
receive a downlink data transmission using resources of a shared radio frequency (RF) spectrum band during a first transmission opportunity (TxOP);
transmit hybrid automatic repeat request (HARQ) feedback in response to the downlink data transmission during the first TxOP or a second TxOP;
determine, after transmitting the HARQ feedback, to clear a buffer of the HARQ feedback during the second TxOP or a third TxOP; and
clear the HARQ feedback from the buffer based at least in part on determining to clear the buffer.

32. The apparatus of claim 31, wherein the instructions are further executable by the processor to:
identify a trigger for transmitting additional HARQ feedback;
transmit the additional HARQ feedback based at least in part on the trigger; and
clear the additional HARQ feedback from an additional buffer based at least in part on transmitting the additional HARQ feedback.

33. The apparatus of claim 32, wherein the buffer is associated with a request-based feedback mode and the additional buffer is associated with an autonomous feedback mode.

34. The apparatus of claim 31, wherein the instructions are further executable by the processor to:
receive a request to transmit the HARQ feedback; and
receive a grant of resources for the HARQ feedback, wherein the HARQ feedback is transmitted using the resources in response to the request.

35. The apparatus of claim 34, wherein the grant of resources includes an indication of an identifier for a HARQ process of the HARQ feedback.

36. The apparatus of claim 34, wherein the request comprises a request to retransmit a subset of previously transmitted feedback.

37. The apparatus of claim 31, wherein the instructions are further executable by the processor to:
identify a trigger for transmitting the HARQ feedback, wherein the HARQ feedback is transmitted based at least part on identifying the trigger.

38. The apparatus of claim 31, wherein the buffer comprises a common buffer for a short physical uplink control channel (sPUCCH), an enhanced physical uplink control channel (ePUCCH), or a physical uplink shared channel (PUSCH).

39. The apparatus of claim 31, wherein the instructions are further executable by the processor to cause the apparatus to:
clear the buffer according to a predetermined periodicity.

40. An apparatus for wireless communication, in a system comprising a processor, memory in electronic communication with the processor, and instructions stored in the memory and operable, when executed by the processor, to cause the apparatus to:
transmit a downlink data transmission using resources of a shared radio frequency (RF) spectrum band during a first transmission opportunity (TxOP);
receive hybrid automatic repeat request (HARQ) feedback in response to the downlink data transmission during the first TxOP or a second TxOP; and
transmit an indication to clear a buffer of the HARQ feedback during the second TxOP or a third TxOP.

41. The apparatus of claim 40, wherein the instructions are further executable by the processor to:
identify a trigger for additional HARQ feedback; and
receive the additional HARQ feedback based at least in part on the trigger.

42. The apparatus of claim 40, wherein the instructions are further executable by the processor to:
transmit a request for the HARQ feedback; and
transmit a grant of resources for the HARQ feedback, wherein the HARQ feedback is transmitted using the resources in response to the request.

43. The apparatus of claim 42, wherein the instructions are further executable by the processor to:
determine that an identifier for a HARQ process associated with the downlink data transmission is unacknowledged, wherein the request for the HARQ feedback is transmitted based at least in part on the determination.

44. The apparatus of claim 40, wherein the instructions are further executable by the processor to:
determine that an identifier for a HARQ process associated with the downlink data transmission is unacknowledged; and
transmit an additional downlink data transmission based at least in part on the determination.

45. The apparatus of claim 40, wherein the buffer comprises a common buffer for a short physical uplink control channel (sPUCCH), an enhanced physical uplink control channel (ePUCCH), or a physical uplink shared channel (PUSCH).

46. A non-transitory computer-readable medium storing code for wireless communication, the code comprising instructions executable by a processor to:
receive a downlink data transmission using resources of a shared radio frequency (RF) spectrum band during a first transmission opportunity (TxOP);
transmit hybrid automatic repeat request (HARQ) feedback in response to the downlink data transmission during the first TxOP or a second TxOP;
determine, after transmitting the HARQ feedback, to clear a buffer of the HARQ feedback during the second TxOP or a third TxOP; and clear the HARQ feedback from the buffer based at least in part on determining to clear the buffer.

47. The non-transitory computer-readable medium of claim 46, wherein the instructions are further executable by the processor to:
identify a trigger for transmitting additional HARQ feedback;
transmit the additional HARQ feedback based at least in part on the trigger; and
clear the additional HARQ feedback from an additional buffer based at least in part on transmitting the additional HARQ feedback.

48. The non-transitory computer-readable medium of claim 47, wherein the buffer is associated with a request-based feedback mode and the additional buffer is associated with an autonomous feedback mode.

49. The non-transitory computer-readable medium of claim 46, wherein the instructions are further executable by the processor to:
receive a request to transmit the HARQ feedback; and
receive a grant of resources for the HARQ feedback, wherein the HARQ feedback is transmitted using the resources in response to the request.

50. The non-transitory computer-readable medium of claim 49, wherein the grant of resources includes an indication of an identifier for a HARQ process of the HARQ feedback.

51. The non-transitory computer-readable medium of claim 49, wherein the request comprises a request to retransmit a subset of previously transmitted feedback.

52. The non-transitory computer-readable medium of claim 46, wherein the instructions are further executable by the processor to:
identify a trigger for transmitting the HARQ feedback, wherein the HARQ feedback is transmitted based at least part on identifying the trigger.

53. The non-transitory computer-readable medium of claim 46, wherein the buffer comprises a common buffer for a short physical uplink control channel (sPUCCH), an enhanced physical uplink control channel (ePUCCH), or a physical uplink shared channel (PUSCH).

54. The non-transitory computer-readable medium of claim 46, wherein the instructions are further executable by the processor to:
clear the buffer according to a predetermined periodicity.

55. A non-transitory computer-readable medium storing code for wireless communication, the code comprising instructions executable by a processor to:
transmit a downlink data transmission using resources of a shared radio frequency (RF) spectrum band during a first transmission opportunity (TxOP);
receive hybrid automatic repeat request (HARQ) feedback in response to the downlink data transmission during the first TxOP or a second TxOP; and
transmit an indication to clear a buffer of the HARQ feedback during the second TxOP or a third TxOP.

56. The non-transitory computer-readable medium of claim 55, wherein the instructions are further executable by the processor to:
identify a trigger for additional HARQ feedback; and
receive the additional HARQ feedback based at least in part on the trigger.

57. The non-transitory computer-readable medium of claim 55, wherein the instructions are further executable by the processor to:
transmit a request for the HARQ feedback; and
transmit a grant of resources for the HARQ feedback, wherein the HARQ feedback is transmitted using the resources in response to the request.

58. The non-transitory computer-readable medium of claim 57, wherein the instructions are further executable by the processor to:
determine that an identifier for a HARQ process associated with the downlink data transmission is unacknowledged, wherein the request for the HARQ feedback is transmitted based at least in part on the determination.

59. The non-transitory computer-readable medium of claim 55, wherein the instructions are further executable by the processor to:
determine that an identifier for a HARQ process associated with the downlink data transmission is unacknowledged; and
transmit an additional downlink data transmission based at least in part on the determination.

60. The non-transitory computer-readable medium of claim 55, wherein the buffer comprises a common buffer for a short physical uplink control channel (sPUCCH), an enhanced physical uplink control channel (ePUCCH), or a physical uplink shared channel (PUSCH).

* * * * *